United States Patent
You et al.

(10) Patent No.: US 10,200,185 B2
(45) Date of Patent: Feb. 5, 2019

(54) METHOD FOR MONITORING PDCCH IN FDD HALF-DUPLEX COMMUNICATION AND TERMINAL THEREOF

(71) Applicant: LG ELECTRONICS INC., Seoul (KR)

(72) Inventors: Hyangsun You, Seoul (KR); Yunjung Yi, Seoul (KR); Suckchel Yang, Seoul (KR); Joonkui Ahn, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/031,178

(22) PCT Filed: Jan. 2, 2015

(86) PCT No.: PCT/KR2015/000010
§ 371 (c)(1),
(2) Date: Apr. 21, 2016

(87) PCT Pub. No.: WO2015/130005
PCT Pub. Date: Sep. 3, 2015

(65) Prior Publication Data
US 2016/0254901 A1    Sep. 1, 2016

Related U.S. Application Data

(60) Provisional application No. 61/945,066, filed on Feb. 26, 2014, provisional application No. 61/952,873, (Continued)

(51) Int. Cl.
*H04W 52/02* (2009.01)
*H04L 5/16* (2006.01)
(Continued)

(52) U.S. Cl.
CPC .................. *H04L 5/16* (2013.01); *H04J 1/16* (2013.01); *H04L 5/0053* (2013.01);
(Continued)

(58) Field of Classification Search
CPC ............ H04J 1/16; H04L 5/16; H04L 5/0053; H04W 52/0216; H04W 52/0229; H04W 76/048; Y02B 60/50
(Continued)

(56) References Cited

U.S. PATENT DOCUMENTS

2009/0316637 A1* 12/2009 Yi .................... H04W 72/10
                                                           370/329
2009/0316638 A1* 12/2009 Yi ................... H04W 72/042
                                                           370/329
(Continued)

FOREIGN PATENT DOCUMENTS

CN          101572945 A     11/2009
WO          2012/150806 A2  11/2012
WO    WO 2013/140716 A1      9/2013

OTHER PUBLICATIONS

Ericsson et at., "Half-duplex operations support with aggregation of TDD carriers with different UL/DL configurations", R1-124773, 3GPP TSG-RAN WG1 Meeting #71, New Orleans, USA, Nov. 2, 2012, pp. 1-3, and figure 1.
(Continued)

*Primary Examiner* — Robert J Lopata
(74) *Attorney, Agent, or Firm* — Birch, Stewart, Kolasch & Birch, LLP

(57) ABSTRACT

One embodiment of the present description provides a method for monitoring a physical downlink control channel (PDCCH). The method for monitoring a PDCCH can comprise the steps of: performing a frequency division duplex (FDD) half-duplex operation; and determining whether to
(Continued)

monitor the PDCCH if discontinuous reception (DRX) is set. Here, when a downlink subframe of a downlink carrier is positioned immediately before an uplink subframe of an uplink carrier, the PDCCH can be monitored in the downlink subframe during an active time.

18 Claims, 33 Drawing Sheets

Related U.S. Application Data filed on Mar. 14, 2014, provisional application No. 61/973,897, filed on Apr. 2, 2014, provisional application No. 62/002,177, filed on May 22, 2014.

(51) Int. Cl.
  *H04W 76/28* (2018.01)
  *H04L 5/00* (2006.01)
  *H04J 1/16* (2006.01)
  *H04W 4/70* (2018.01)

(52) U.S. Cl.
  CPC ... *H04W 52/0216* (2013.01); *H04W 52/0229* (2013.01); *H04W 76/28* (2018.02); *H04W 4/70* (2018.02); *Y02D 70/00* (2018.01); *Y02D 70/1242* (2018.01); *Y02D 70/1262* (2018.01); *Y02D 70/1264* (2018.01); *Y02D 70/21* (2018.01); *Y02D 70/23* (2018.01); *Y02D 70/24* (2018.01)

(58) Field of Classification Search
  USPC .......................................................... 370/281
  See application file for complete search history.

(56) References Cited

U.S. PATENT DOCUMENTS

| | | | |
|---|---|---|---|
| 2011/0038277 A1 | 2/2011 | Hu et al. | |
| 2011/0292854 A1* | 12/2011 | Terry | H04L 5/001 370/311 |
| 2012/0057490 A1* | 3/2012 | Park | H04W 76/048 370/252 |
| 2012/0178445 A1* | 7/2012 | Dalsgaard | H04W 72/02 455/434 |
| 2013/0301421 A1 | 11/2013 | Yi et al. | |
| 2014/0029459 A1* | 1/2014 | Kwon | H04W 76/048 370/252 |
| 2014/0198701 A1* | 7/2014 | Ostergaard | H04W 76/048 370/311 |
| 2014/0242989 A1* | 8/2014 | Cai | H04W 52/54 455/436 |
| 2015/0098414 A1* | 4/2015 | Kuo | H04W 72/10 370/329 |
| 2015/0208461 A1* | 7/2015 | Lee | H04W 76/048 370/311 |
| 2015/0300090 A1 | 10/2015 | Strand | |
| 2016/0044641 A1* | 2/2016 | Bai | H04L 5/0053 370/281 |
| 2016/0192433 A1* | 6/2016 | Deenoo | H04W 72/046 370/329 |
| 2016/0212794 A1* | 7/2016 | Szabo | H04W 52/0206 |
| 2016/0360510 A1* | 12/2016 | Lee | H04L 5/1469 |
| 2017/0048734 A1* | 2/2017 | Kusashima | H04W 16/32 |
| 2017/0195028 A1* | 7/2017 | Shimezawa | H04B 7/0626 |
| 2017/0311373 A1* | 10/2017 | Ostergaard | H04W 52/0274 |

OTHER PUBLICATIONS

Ericsson et al., "MAC layer support of half-duplex UEs in TDD inter-band CA", R2-125504, 3GPP TSG-RAN WG2 Meeting #80, New Orleans, Louisiana, USA, Nov. 2, 2012, pp. 1-3.
Huawei et at., "DRX operation for half-duplex UE in different TDD UL-DL configurations", R2-125530, 3GPP TSG-RAN WG2 Meeting #80, New Orleans, USA Nov. 2, 2012, pp. 1-4.
LG Electronics Inc., "Half-duplex operation for cell-specific TDD configuration", R2-125739, 3GPP TSG-RAN WG2 Meeting #80, New Orleans, USA, Nov. 3, 2012, pp. 1-3.
3GPP, "Technical Specification Group Radio Access Network; Evolved Universal Terrestrial Radio Access (E-UTRA); Medium Access Control (MAC) protocol specification (Release 12)", 3GPP TS 36.321 V12.0.0, Dec. 2013, pp. 1-57.
3GPP, Technical Specification Group Radio Access Network; Evolved Universal Terrestrial Radio Access (E-UTRA); Physical channels and modulation (Release 12), 3GPP TS 36.211 V12.0.0, Dec. 2013, pp. 1-120.
Ericsson et al., "Long connected DRX period for reduced UE power consumption", S2-124250, SA WG2 Meeting #94, New Orleans, Nov. 12-16, 2012, pp. 1-5.
Huawei et al., "Further disucssion on half duplex FDD for low complexity MTC", R4-140189, 3GPP TSG-RAN WG4 Meeting #70, Prague, Czech, Feb. 10-14, 2014, pp. 1-4.
Huawei et al., "MAC impact due to Half-Duplex FDD operation for low cost MTC UEs", R2-142078, 3GPP TSG-RAN WG2 #86, Seoul, Korea, May 19-23, 2014, pp. 1-3.
LG Electronics Inc., "Extended DRX cycle for the connected mode", R2-131881, 3GPP TSG-RAN WG2 Meeting #82, Fukuoka, Japan, May 15-19, 2013, 2 pages.
LG Electronics, "HD-FDD support for low-cost MTC", R1-141334, 3GPP TSG RAN WG1 Meeting #76bis, Shenzhen, China, Mar. 31-Apr. 4, 2014, pp. 1-4.
TSG-RAN WG4, "[Draft] Reply LS on half duplex FDD operation for Low complexity MTC UE", R4-141235, 3GPP TSG-RAN WG4 Meeting #70, Prague, Czech, Feb. 10-14, 2014, 1 page.
TSG-RAN1, "LS on coverage improvement for Low-Cost MTC UEs based on LTE", R2-132265, 3GPP TSG RAN WG2 Meeting #83, Barcelona, Spain, Aug. 19-23, 2013, 1 page.
3GPP, "Technical Specification Group Radio Access Network; Evolved Universal Terrestrial Radio Access (E-UTRA); Medium Access Control (MAC) protocol specification (Release 10)", 3GPP TS 36.321 V10.4.0, Dec. 20, 2011, 54 pages.
Ericsson, "Guard period for low complexity UE in half-duplex FDD", R1-142373, 3GPP TSG-RAN WG1 Meeting #77, Seoul, Korea, May 19-23, 2014, 6 pages.
Ericsson, et al, MAC layer support of half-duplex UEs in TDD inter-baned CA, Tdoc R2-124669, 3GPP TSG-RAN WG2 #79bis, Bratislava, Slovakia, Oct. 8-12, 2012, 2 pages.
Ericsson, et al., "Half Duplex FDD in LTE", R1-080534, TSG-RAN WG1 #51bis, Sevilla, Spain, Jan. 14-18, 2008, 5 pages.
Ericsson, et al., "Support of half-duplex operations in aggregation of TDD carriers with different UL/DL configurations", R1-121989, 3GPP TSG-RAN WG1 #69, Prague, Czech, Republic, May 21-25, 2012, 3 pages.
LG Electronics, "HD-FDD support for low-cost MTC", R1-142133, 3GPP TSG RAN WG1 Meeting #77, Seoul, Korea, May 19-23, 2014, 4 pages.

* cited by examiner

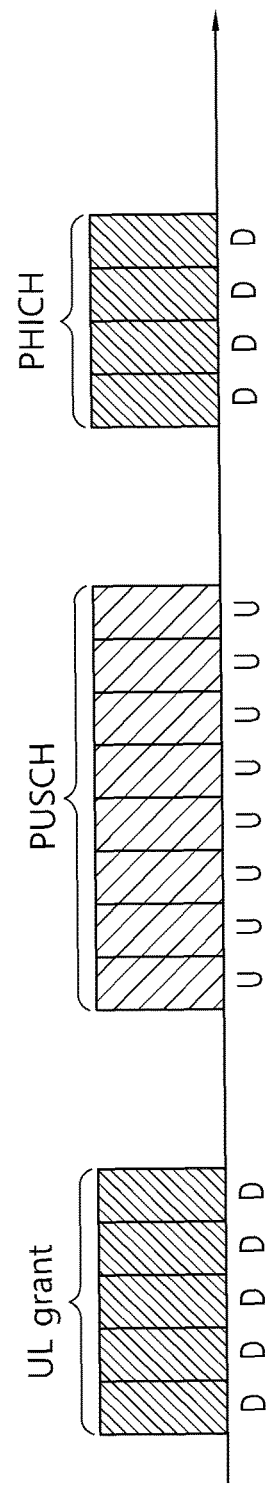

METHOD FOR MONITORING PDCCH IN FDD HALF-DUPLEX COMMUNICATION AND TERMINAL THEREOF

CROSS REFERENCE TO RELATED APPLICATIONS

This application is the National Phase of PCT International Application No. PCT/KR2015/000010, filed on Jan. 2, 2015, which claims priority under 35 U.S.C. 119(e) to U.S. Provisional Application Nos. 61/945,066, filed on Feb. 26, 2014, 61/952,873, filed on Mar. 14, 2014, 61/973,897 filed on Apr. 2, 2014 and 62/002,177 filed on May 22, 2014, all of which are hereby expressly incorporated by reference into the present application.

BACKGROUND OF THE INVENTION

Field of the Invention

The present invention relates to mobile communication.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", 3GPP LTE/LTE-A may divide the physical channel into a downlink channel, i.e., a physical downlink shared channel (PDCCH) and a physical downlink control channel (PDCCH), and an uplink channel, i.e., a physical uplink shared channel (PUSCH) and a physical uplink control channel (PUCCH).

Meanwhile, in recent years, research into communication between devices or the device and a server without human interaction, that is, without human intervention, that is, machine type communication (MTC) has been actively conducted. The MTC represents a concept in which not a terminal used by human but a machine performs communication by using the existing wireless communication network.

In the case of peculiarities of the device using the MTC, since a transmission data amount is small and uplink/downlink transmission/reception is often performed, it may be preferable to increase a supply rate instead of lowering a price of the MTC device according to the low data transmission rate. For example, manufacturing cost of the MTC device is lowered by applying half-duplex (HD) communication to increase the supply rate. In this case, LTE/LTE-A is divided into a TDD scheme and an FDD scheme and the MTC device may use a half-duplex (HD) communication based FDD scheme.

However, in the related art, since the half-duplex (HD) communication based FDD scheme is not technologically implemented, it is actually difficult to use the half-duplex (HD) communication based FDD scheme.

SUMMARY OF THE INVENTION

Accordingly, an embodiment of the present description has been made in an effort to solve the problem.

In order to achieve the aforementioned object, the present invention provides a method for monitoring a Physical Downlink Control Channel (PDCCH). The method may performed by a terminal and comprise: performing a half-duplex operation in a frequency division duplex (FDD); and determining whether to monitor a PDCCH when a discontinuous reception (DRX) is configured. Here, during an active time, the PDCCH is monitored on a downlink subframe, when the downlink subframe of a downlink carrier does not immediately precedes an uplink subframe of an uplink carrier.

In order to achieve the aforementioned object, the present invention provides a terminal for monitoring a physical downlink control channel (PDCCH). The terminal may comprise: an RF unit; and a processor controlling the RF unit and configured to determine whether to monitor the PDCCH when discontinuous reception (DRX) is configured while performing a frequency division duplex (FDD) half-duplex operation. Here, during an active time, the PDCCH is monitored on a downlink subframe, when the downlink subframe of a downlink carrier does not immediately precedes an uplink subframe of an uplink carrier.

When the downlink subframe of the downlink carrier immediately precedes the uplink subframe of the uplink carrier, a part or the entirety of the downlink subframe may not be received to generate a guard period in the downlink subframe. When the downlink subframe corresponds to a guard period subframe, the PDCCH may not be monitored on the downlink subframe.

When the downlink subframe of the downlink carrier does not immediately precede the uplink subframe of the uplink carrier, the PDCCH may be monitored on the downlink subframe during the active time. When the downlink subframe of the downlink carrier immediately precedes the uplink subframe of the uplink carrier, a part or the entirety of the downlink subframe may not be received to generate the guard period in the downlink subframe. When the downlink subframe corresponds to the guard period subframe, the PDCCH may not be monitored on the downlink subframe.

As the FDD half duplex operation is performed, reception on the downlink subframe of the downlink carrier and transmission on the uplink subframe of the uplink carrier may be similarly unavailable.

A radio frame on the downlink carrier may include 10 downlink subframes, and a radio frame on the uplink carrier may include 10 uplink subframes.

According to the embodiment of the present description, the problem in the related art is solved.

BRIEF DESCRIPTION OF THE DRAWINGS

FIGS. 22a and 22b are exemplary diagrams illustrating one example of the HD-FDD operation for the MTC device of which the coverage expansion is not required.

DESCRIPTION OF EXEMPLARY EMBODIMENTS

Figure 1:
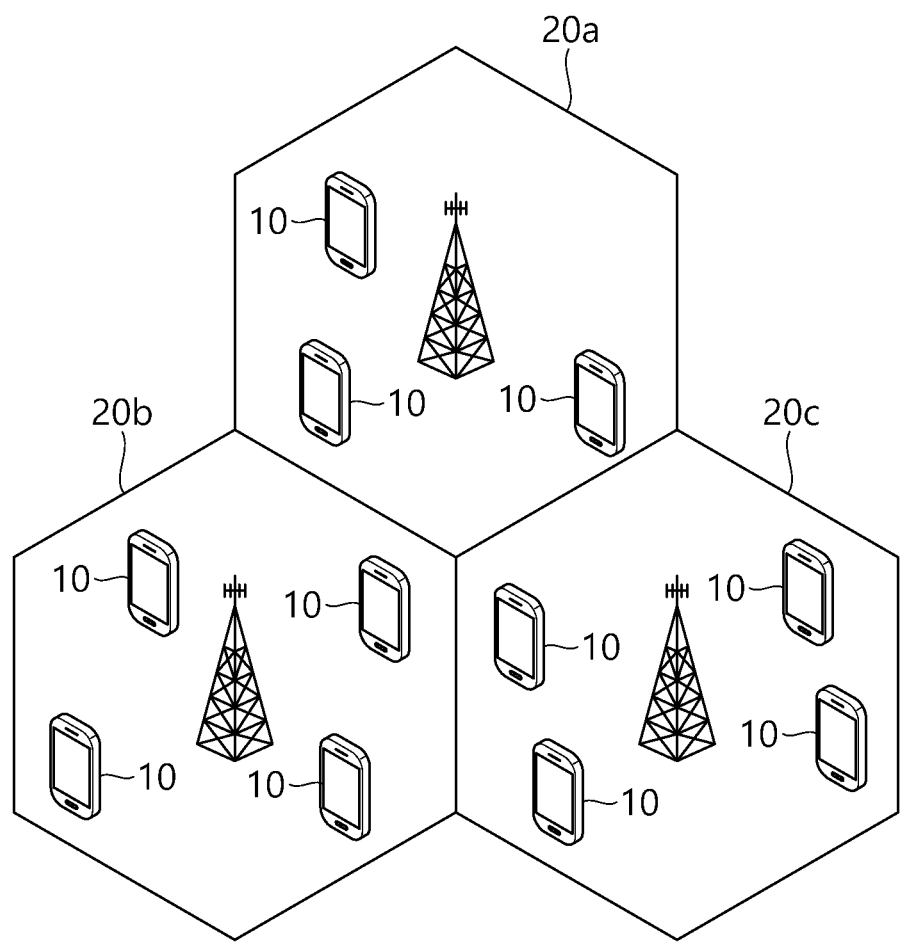
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
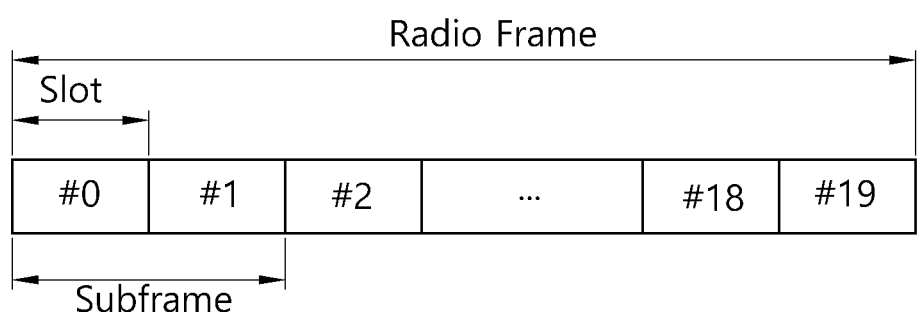
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
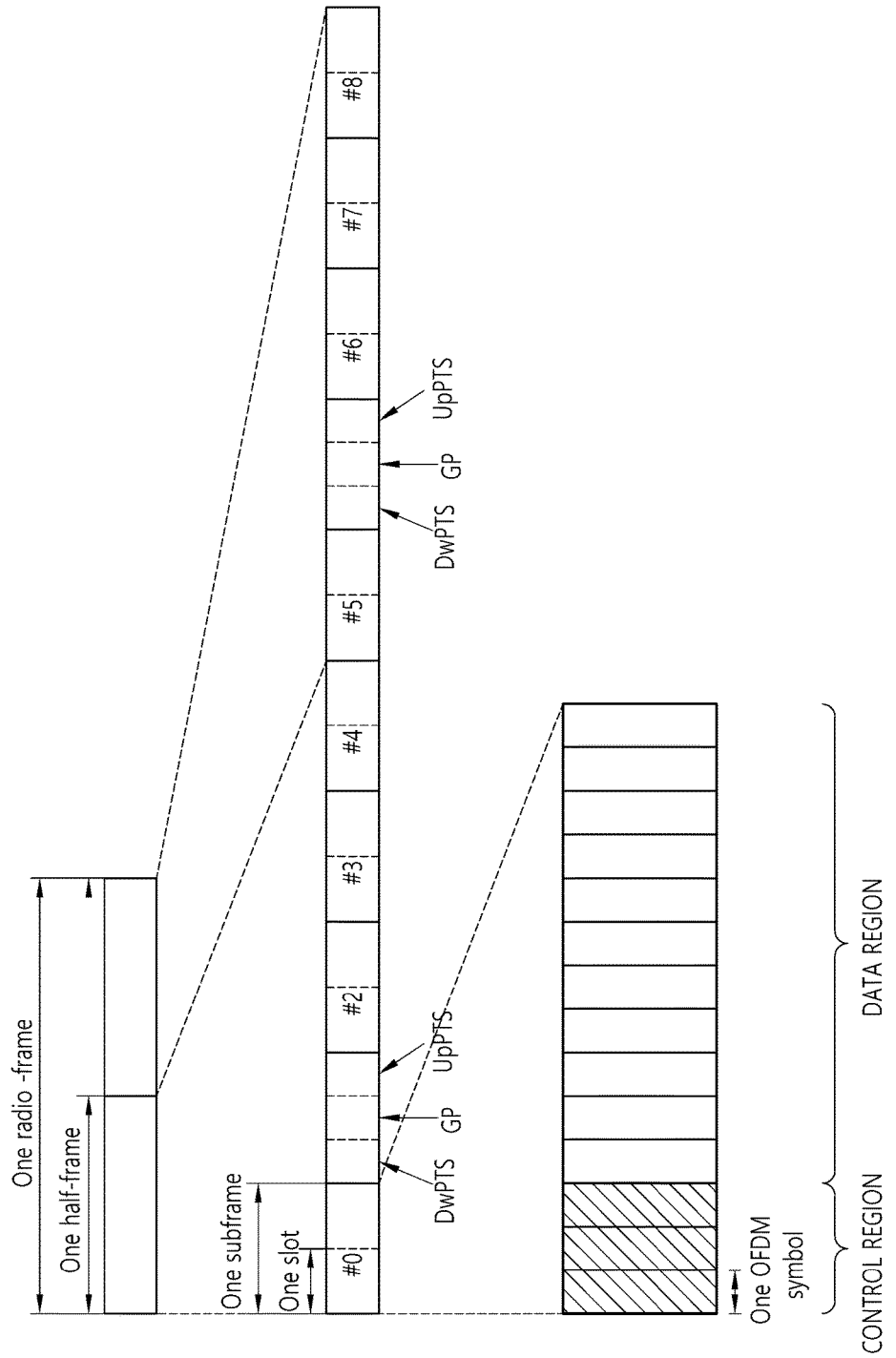
FIG. 3 illustrates a structure of a downlink radio frame according to TDD in the 3GPP LTE.

FIG. 3 illustrates the architecture of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) sub-frame co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| | Normal CP in downlink | | | Extended CP in downlink | | |
|---|---|---|---|---|---|---|
| | | UpPTS | | | UpPTS | |
| Special subframe configuration | DwPTS | Normal CP in uplink | Extended CP in uplink | DwPTS | Normal CP in uplink | Extended CP in uplink |
| 0 | 6592*Ts | 2192*Ts | 2560*Ts | 7680*Ts | 2192*Ts | 2560*Ts |
| 1 | 19760*Ts | | | 20480*Ts | | |
| 2 | 21952*Ts | | | 23040*Ts | | |
| 3 | 24144*Ts | | | 25600*Ts | | |
| 4 | 26336*Ts | | | 7680*Ts | 4384*Ts | 5120*ts |
| 5 | 6592*Ts | 4384*Ts | 5120*ts | 20480*Ts | | |
| 6 | 19760*Ts | | | 23040*Ts | | |
| 7 | 21952*Ts | | | — | | |
| 8 | 24144*Ts | | | — | | |

Figure 4:
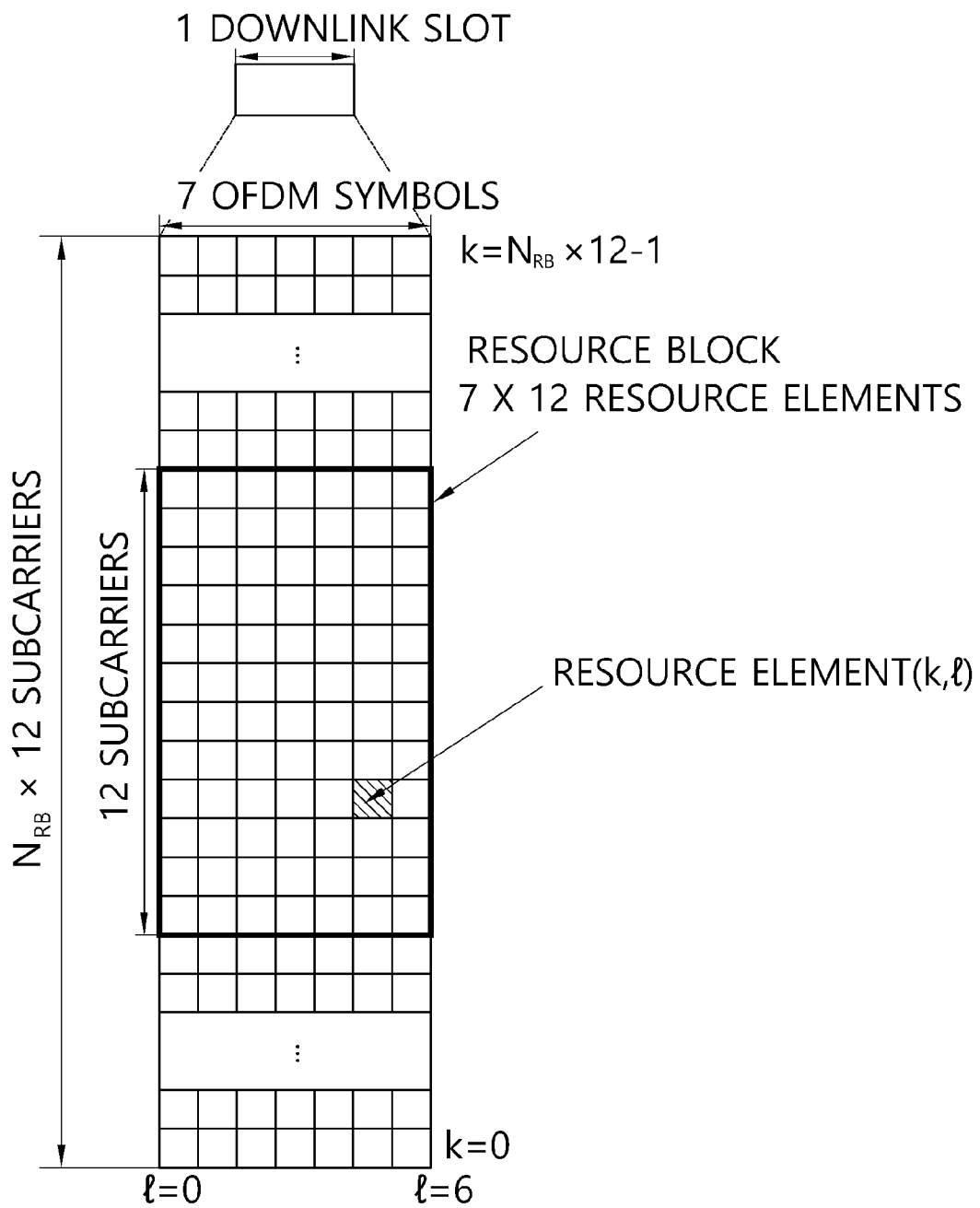
FIG. 4 is an exemplary diagram illustrating a resource grid for one uplink or downlink slot in the 3GPP LTE.

FIG. 4 Illustrates an Example Resource Grid for One Uplink or Downlink Slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
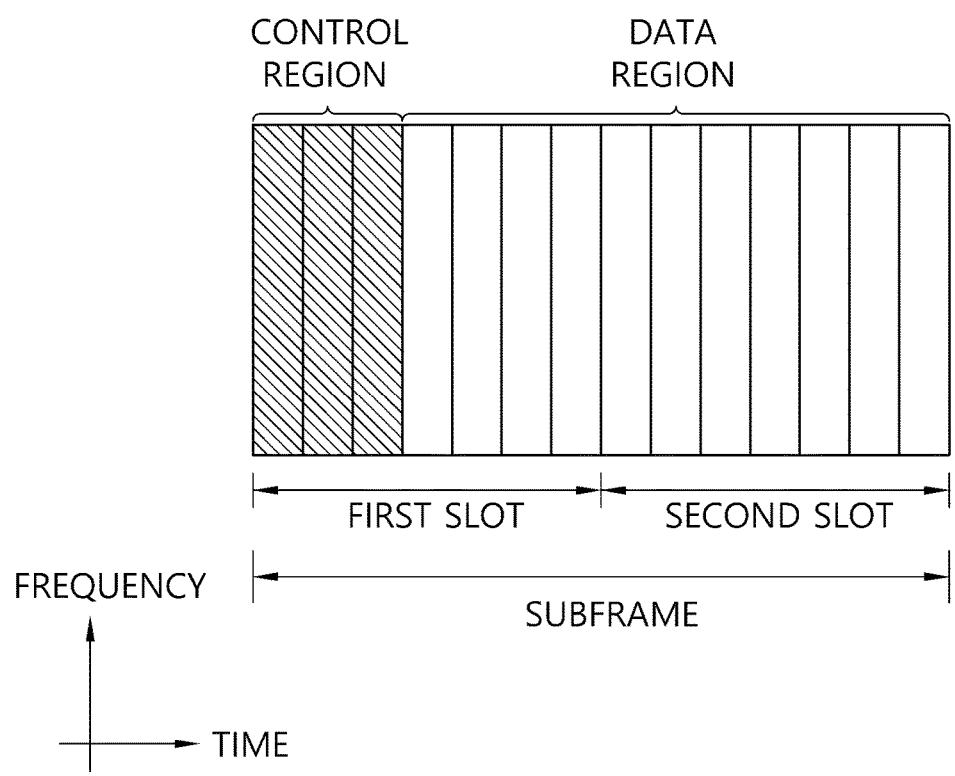
FIG. 5 illustrates a structure of a downlink subframe.

FIG. 5 illustrates the architecture of a downlink sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/ NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

When UE monitors a PDCCH based on a C-RNTI, a DCI format and a search space to be monitored are determined depending on transmission mode of a PDSCH. The following table shows an example of the monitoring of a PDCCH in which a C-RNTI is set.

TABLE 3

| Transmission mode | DCI format | Search space | Transmission mode of PDSCH according to PDCCH |
|---|---|---|---|
| Transmission mode 1 | DCI format 1A | Public service and terminal specific | Single antenna port, port 0 |
| | DCI format 1 | Terminal specific | Single antenna port, port 0 |

TABLE 3-continued

| Transmission mode | DCI format | Search space | Transmission mode of PDSCH according to PDCCH |
|---|---|---|---|
| Transmission mode 2 | DCI format 1A | Public service and terminal specific | Transmit diversity |
| | DCI format 1 | Terminal specific | Transmit diversity |
| Transmission mode 3 | DCI format 1A | Public service and terminal specific | Transmit diversity |
| | DCI format 2A | Terminal specific | CDD(Cyclic Delay Diversity) or transmit diversity |
| Transmission mode 4 | DCI format 1A | Public service and terminal specific | Transmit diversity |
| | DCI format 2 | Terminal specific | Closed-loop spatial multiplexing |
| Transmission mode 5 | DCI format 1A | Public service and terminal specific | Transmit diversity |
| | DCI format 1D | Terminal specific | MU-MIMO(Multi-user Multiple Input Multiple Output) |
| Transmission mode 6 | DCI format 1A | Public service and terminal specific | Transmit diversity |
| | DCI format 1B | Terminal specific | Closed-loop spatial multiplexing |
| Transmission mode 7 | DCI format 1A | Public service and terminal specific | If the number of PBCH transmisison ports is 1, single antenna port, port 0. Otherwise, transmit diversity |
| | DCI format 1 | Terminal specific | Single antenna port, port 5 |
| Transmission mode 8 | DCI format 1A | Public service and terminal specific | If the number of PBCH transmisison ports is 1, single antenna port, port 0. Otherwise, transmit diversity |
| | DCI format 2B | Terminal specific | Dual layer transmisison (port 7 or 8), or single antenna port, port 7 or 8 |
| Transmission mode 9 | DCI format 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2C | Terminal specific | 8 transmisison layers, ports 7-14 are used or port 7 or 8 is used as independent antenna port |
| Transmission mode 10 | DCI 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2D | Terminal specific | 8 transmisison layers, ports 7-14 are used or port 7 or 8 is used as independent antenna port |

The usage of the DCI format is classified as shown in Table 3 below.

TABLE 4

| DCI format | Contents |
|---|---|
| DCI format 0 | Used in PUSCH scheduling |
| DCI format 1 | Used in scheduling of one PDSCH codeword |
| DCI format 1A | Used in compact scheduling of one PDSCH codeword and random access process |
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 2B | DCI format 2B is used for resouce allocation for dual-layer beam-forming of PDSCH. |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |

TABLE 4-continued

| DCI format | Contents |
|---|---|
| DCI format 3 | Used to transmit TPC command of PUCCH and PUSCH having 2 bit power adjustments |
| DCI format 3A | Used to transmit TPC command of PUCCH and PUSCH having 1 bit power adjustment |
| DCI format 4 | Used in PUSCH scheduling of uplink (UP) operated in multi-antenna port transmisison mode |

Now, DRX will be described.

The discontinuous reception (DRX) is a technique that allows the terminal to discontinuously monitor the downlink channel to reduce battery consumption. When the DRX is set, the terminal discontinuously monitors the downlink channel. If not, the terminal continuously monitors the downlink channel.

In recent years, a lot of applications require an always-on characteristic. Always-on represents a characteristic that the terminal always accesses the network, and as a result, the terminal may immediately transmit data as necessary.

However, when the terminal continuously maintains the network access, the battery consumption is heavy, and as a result, setting the DRX appropriate to the corresponding application may guarantee the always-on characteristic while reducing the battery consumption.

Figure 6:
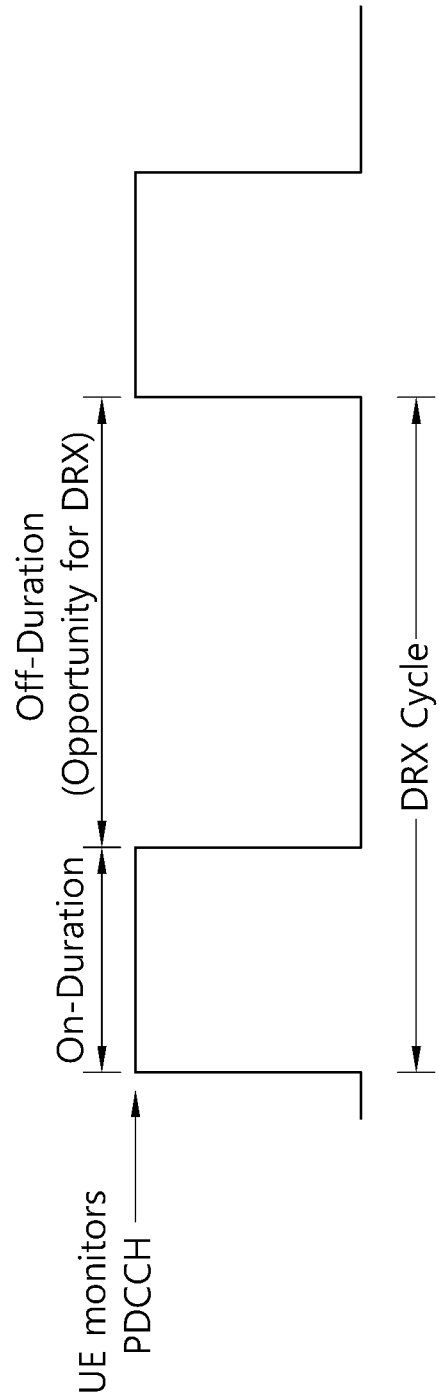
FIG. 6 illustrates a DRX cycle.

FIG. 6 illustrates a DRX cycle.

The DRX cycle specifies periodic repetition of on-duration in which an available period of inactivity is continued. The DRX cycle includes an on-period and an off-period. The on-period is a period in which the terminal monitors the PDCCH within the DRX cycle.

When the DRX is set, the terminal may monitor the PDCCH only during the on-period and not monitor the PDCCH during the off-period.

An on-duration timer is used to define the on-period. The on-duration may be defined as a period in which the onDuration timer operates. The onDuration timer specifies the number of continuous PDCCH-subframes at a start time of the DRX cycle. The PDCCH-subframe indicates a subframe in which the PDCCH is monitored.

Except for the DRX cycle, a period in which the PDCCH is monitored may be further defined. The period in which the PDCCH is monitored is collectively named to be defined as an active time.

A drx-Inactivity timer deactivates the DRX. When the drx-Inactivity timer operates, the terminal continuously monitors the PDCCH regardless of the DRX cycle. The drx-Inactivity timer starts when an initial UL grant or DL grant is received on the PDCCH. The drx-Inactivity timer may specify the number of continuous PDCCH-subframes after successfully decoding the PDCCH indicating initial UL or DL user data transmission for corresponding UE.

An HARQ RTT timer defines a minimum period in which the terminal anticipates DL HARQ retransmission. The HARQ RTT timer may specify a minimum quantity mount of subframes before the DL HARQ retransmission anticipated by the terminal.

A drx-Retransmission timer defines a period in which the PDCCH is monitored while the terminal anticipates DL retransmission. The drx-Retransmission timer may specify the maximum number of continuous PDCCH-subframes just after the DL retransmission is anticipated by the terminal. After initial DL transmission, the terminal drives the HARQ RTT timer. When an error is discovered with respect to the initial DL transmission, the terminal transmits an NACK to a base station, stops the HARQ RTT timer, and drives the drx-Retransmission timer. The terminal monitors the PDCCH for the DL retransmission from the base station while the drx-Retransmission timer operates.

The active time may include an on-period in which the PDCCH is periodically monitored and a period in which the PDCCH is monitored due to occurrence of an event.

When the DRX cycle is set, the active time may include the following time.

onDuration timer, drx-Inactivity timer, drx-Retransmission timer and/or mac-ContentionResolution timer which starts;

A time when a scheduling request is transmitted onto the PUCCH and is pended;

A time when the UL grant for the HARQ retransmission which is pended may occur and data is present in a corresponding HARQ buffer;

A time when a PDCCH indicating new transmission toward a C-RNTI of the terminal is not received after a random access response for a preamble selected by the terminal is successfully received.

Figure 7:
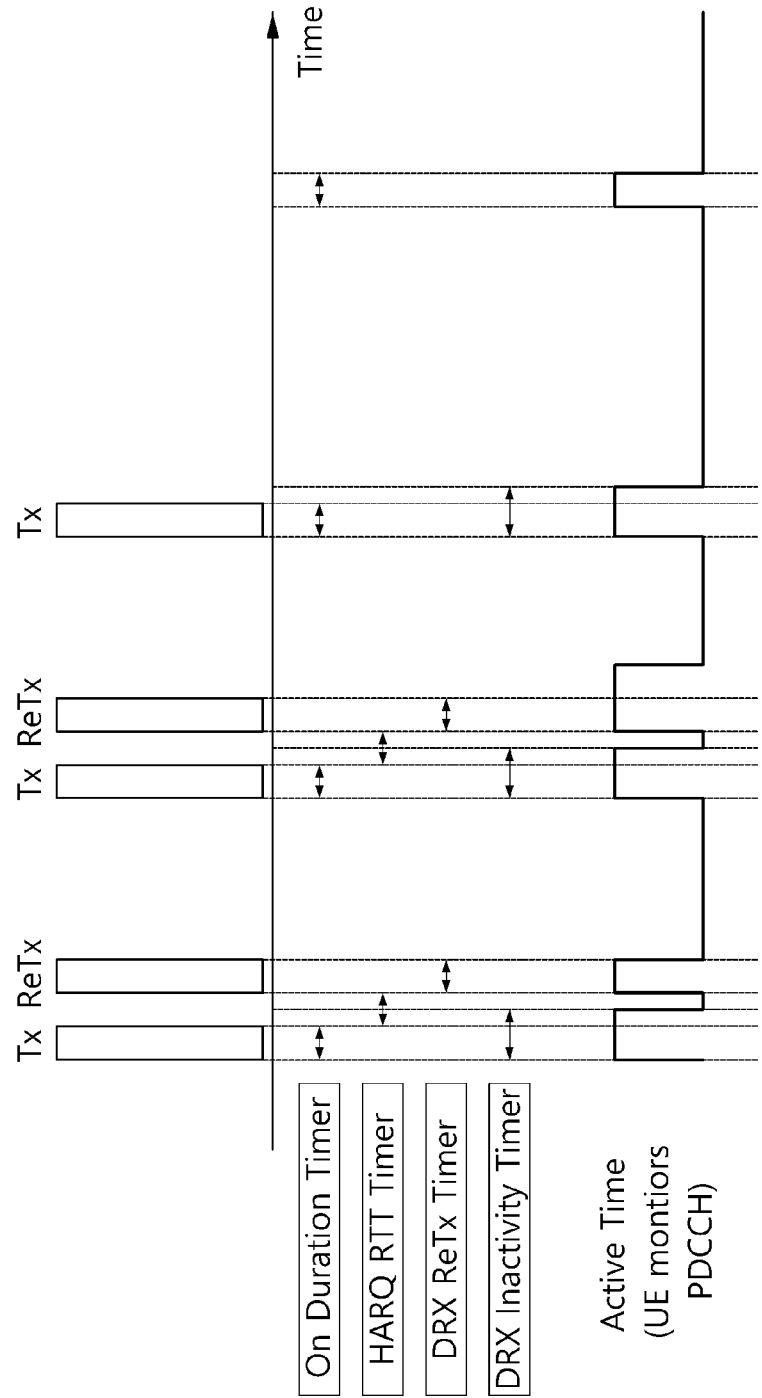
FIG. 7 illustrates an active time in the 3GPP LTE.

FIG. 7 illustrates an active time in the 3GPP LTE.

When the DRX is set, the terminal needs to perform the following operation with respect to each subframe.

When the HARQ RTT timer is expired in the subframe and data of a corresponding HARQ process is not successfully decoded:

The drx-Retransmission for the corresponding HARQ process starts.

When a DRX command MAC control element (CE) is received:

The onDuration timer and the drx-Inactivity timer stop.

When the drx-Inactivity timer is expired or the DRX Command MAC CE is received in the subframe:

When a short DRX cycle is set: A drx-shortcycle timer starts or restarts and the short DRX cycle is used.

If not: a long DRX cycle is used.

When the drx-shortcycle timer is expired in the subframe: the long DRX cycle is used.

When the short DRX cycle is used and [(SFN*10)+ subframe number] modulo (shortDRX-Cycle)=(drx-StartOffset) modulo (shortDRX-Cycle) is satisfied; or When the long DRX cycle is used and [(SFN*10)+ subframe number] modulo (longDRX-Cycle)=drx-StartOffset is satisfied:

The onDuration timer starts.

When during the active time, the subframe is not required for the UL transmission for a half-duplex FDD terminal operation with respect to the PDCCH-subframe and the subframe is not a part of a configured measurement gap:

the PDCCH is monitored;

When the PDCCH indicates the DL transmission or DL allocation is configured with respect to the subframe:

The HARQ RTT timer for the corresponding HARQ process starts;

The drx-Retransmission for the corresponding HARQ process stops.

When the PDCCH indicates new (DL or UL) transmission:

The drx-Inactivity timer starts or restarts.

The DRX cycle includes two types of the long DRX cycle and the short DRX cycle. The long DRX cycle of a long period may minimize the battery consumption of the terminal and the short DRX cycle of a short period may minimize a data transmission delay.

Meanwhile, the reference signal is hereinafter described.

Generally, transmission information, e.g., data, may be prone to be distorted or varied while transmitted through a wireless channel. Accordingly, a reference signal is required to demodulate the transmission information without errors. The reference signal is a signal previously known between the transmitter and the receiver and is transmitted together with transmission information. Since transmission information transmitted from the transmitter goes through a channel corresponding to each transmission antenna or layer, the reference signal may be allocated per transmission antenna or layer. The reference signal per transmission antenna or layer may be differentiated using resources, such as time, frequency, or code. The reference signal may be used for two purposes, i.e., demodulation and channel estimation of transmission information.

There may be two types of reference signals depending on the category of a receiver previously aware of a reference signal. The first reference signal is a reference signal that is known to only a particular receiver (e.g., a particular UE) and such reference signal is denoted a dedicated RS (DRS). The dedicated reference signal, in such meaning, is also referred to as a UE-specific RS. The second reference signal is a reference signal that is known to all the receivers in a cell, e.g., all the UEs, and such reference signal is denoted a common RS (CRS). The CRS is also denoted a cell-specific RS.

Further, reference signals may be classified depending on uses. For example, a reference signal used for data demodulation is denoted a demodulation RS (DM-RS). A reference signal used for feedback information indicating a channel state, such as CQI/PMI/RI, is denoted a CSI-RS (channel state indicator-RS). The DRS may be used as a DM-RS. It is hereinafter assumed that the DM-RS is a DRS.

Figure 8:
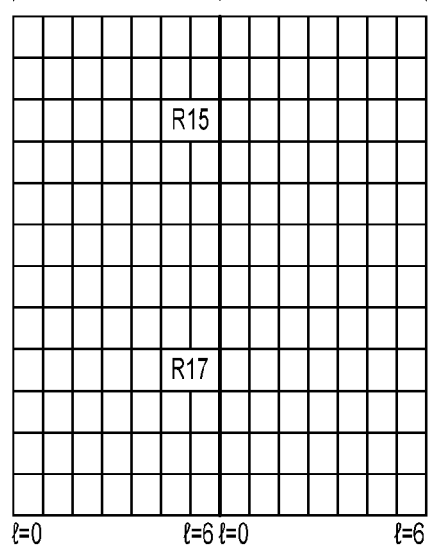
FIG. 8 illustrates one example an RB to which a CSI-RS is mapped among reference signals.
Figure 8:
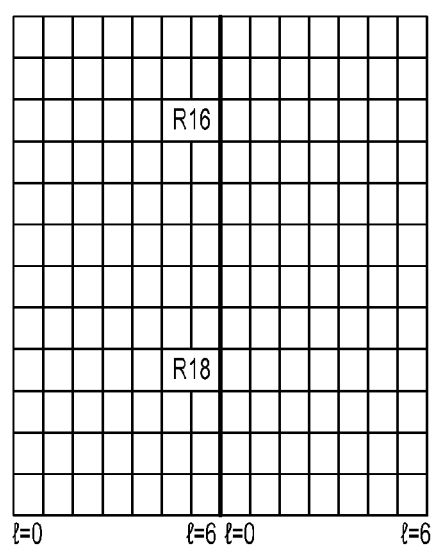
Figure 8:
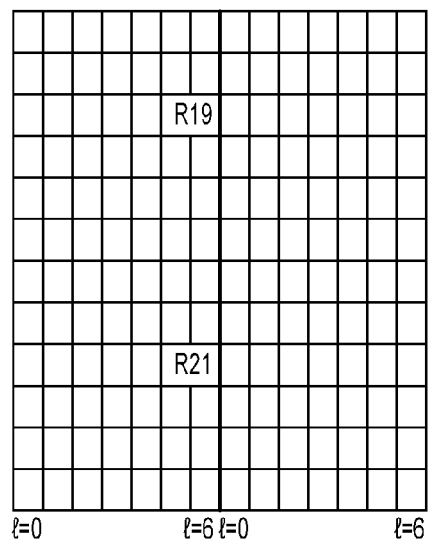
Figure 8:
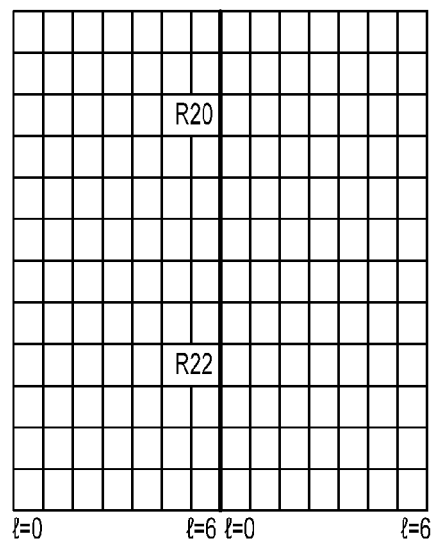

FIG. 8 illustrates an example of CSI-RS mapping.

For the channel state estimation, CSI-RS (channel status information-reference signal) is defined in addition to the CRS for channel state estimation. The CSI-RS has maximum 32 different settings in order to reduce inter-cell interference in a multiple cell environment unlike the CRS.

CSI-RSs are transmitted through one, two, four, or eight antenna ports. The antenna ports used here are p=15, p=15, 16, p=15, . . . , 18 and p=15, . . . , 22, respectively. That is, CSI-RSs may be transmitted through one, two, four, and eight antenna ports. See 3GPP (3rd Generation Partnership Project) TS 36.211 V10.1.0 (2011-03) "Technical Specification Group Radio Access Network; Evolved Universal Terrestrial Radio Access (E-UTRA); Physical channels and modulation (Release 8)," Ch. 6.10.5 for the CSI-RS.

In transmission of a CSI-RS, up to 32 different configurations may be proposed to reduce inter-cell interference (ICI) in a multi-cell environment including a heterogeneous network (HetNet) environment. The configuration of the CSI-RS may be varied depending on the number of antenna ports in the cell and CP, and a neighboring cell may have a configuration as different as possible. Further, CSI-RS configurations may be divided depending on the frame structure into ones applied to both the FDD frame and TDD frame and ones applied only to the TDD frame. A plurality of CSI-RS configurations in one cell may be used. Zero or one CSI-RS configuration for UEs assuming non-zero power CSI-RSs and 0 or several CSI-RS configurations for UEs assuming zero power CSI-RSs may come in use.

The CSI-RS configurations may be indicated by a higher layer. For example, a CSI-RS-Config IE (information element) transmitted through a higher layer may indicate a CSI-RS configuration. Below table shows an example of CSI-RS-Config IE.

TABLE 5

| | |
|---|---|
| CSI-RS-Config-r10 ::= | SEQUENCE { |
| csi-RS-r10 | CHOICE { |
| release | NULL, |

TABLE 5-continued

| | |
|---|---|
| setup | SEQUENCE { |
| antennaPortsCount-r10 | ENUMERATED {an1, an2, an4, an8}, |
| resourceConfig-r10 | INTEGER (0..31), |
| subframeConfig-r10 | INTEGER (0..154), |
| p-C-r10 | INTEGER (-8..15) |
| } | |
| } | OPTIONAL,   -- Need ON |
| } | |
| zeroTxPowerCSI-RS-r10 | CHOICE { |
| release | NULL, |
| setup | SEQUENCE { |
| zeroTxPowerResourceConfigList-r10 | BIT STRING (SIZE (16)), |
| zeroTxPowerSubframeConfig-r10 | INTEGER (0..154) |
| } | |
| } | OPTIONAL   -- Need ON |
| } | |
| -- ASN1STOP | |

Referring to Table 1, the 'antennaPortsCount' field indicates the number of antenna ports used for transmission of a CSI-RS. The 'resourceConfig' field indicates a CSI-RS configuration. The 'SubframeConfig' field and 'zeroTxPowerSubframeConfig' field indicate sub-frame configurations where a CSI-RS is transmitted.

The 'zeroTxPowerResourceConfigList' field indicates a zero-power CSI-RS configuration. The CSI-RS configurations corresponding to bits set to 1's in the bitmap of 16 bits constituting the 'zeroTxPowerResourceConfigList' field may be set as zero-power CSI-RSs.

A sequence $r_{l,n_s}(m)$ for CSI-RS may be generated as in the following equation.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$

$$m = 0, \ldots, N_{RB}^{max,DL} - 1$$

where, $c_{init} =$ $$2^{10} \cdot (7 \cdot (n_s + 1) + l + 1) \cdot (2 \cdot N_{ID}^{cell} + 1) + 2 \cdot N_{ID}^{cell} + N_{CP}$$

$$N_{CP} = \begin{cases} 1 & \text{for normal } CP \\ 0 & \text{for extended } CP \end{cases}$$

In Equation 1, $n_s$ is a slot number in the radio frame, and l is an OFDM symbol number in the slot. c(i) is a pseudo random sequence and is started at each OFDM symbol with $c_{init}$ indicated in Equation 1. $N_{ID}^{cell}$ means a physical cell ID.

In sub-frames configured to transmit CSI-RSs, the reference signal sequence $r_{l,n_s}(m)$ is mapped to a complex value modulation symbol $a_{k,l}^{(p)}$ used as a reference symbol for antenna port p.

The relationship between $r_{l,n_s}(m)$ and $a_{k,l}^{(p)}$ is given as in the following equation.

$$a_{k,l}^{(p)} = w_{l''} \cdot r(m) \quad \text{[Equation 2]}$$

where, $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

-continued $$l = l'' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In the Equation, (k', l') and $n_s$ are given in Tables 2 and 3 described below. A CSI-RS may be transmitted in a downlink slot where ($n_s$ mod 2) meets the conditions in Tables 2 and 3 to be described below (where, 'mod' means modular computation. That is, ($n_s$ mod 2) means the remainder obtained by dividing $n_s$ by 2).

Below table represents a CSI-RS configuration in normal CP, and Table 3 represents a CSI-RS configuration in extended CP.

TABLE 6

| CSI-RS configuration index | Number of configured CSI-RSs | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| TDD and FDD frames | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| TDD frame | | | | | | |
| 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 7

| | CSI-RS configuration index | Number of configured CSI-RSs | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| TDD and FDD frames | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| TDD frame | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

The UE may transmit CSI-RSs only in the downlink slot meeting the condition of ns mod 2 in Tables 5 and 6. Further, the UE abstains from transmitting CSI-RSs in a special sub-frame of a TDD frame, a sub-frame where CSI-RS transmission collides with a synchronization signal, PBCH (physical broadcast channel), and system information block type 1 (SystemInformationBlockType1) or a sub-frame where a paging message is transmitted. Further, in a set S, where S={15}, S={15, 16}, S={17, 18}, S={19, 20} or S={21, 22}, a resource element where a CSI-RS of one antenna port is transmitted is not used for transmission of a CSI-RS of another antenna port.

Below table shows an example of a configuration of a sub-frame where a CSI-RS is transmitted.

TABLE 8

| CSI-RS-SubframeConfig $I_{CSI-RS}$ | CSI-RS period $T_{CSI-RS}$ (sub-frame) | CSI-RS sub-frame offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Referring to above table, depending on the CSI-RS sub-frame configuration ($I_{CSI-RS}$), the period ($T_{CSI-RS}$) of the sub-frame where CSI-RSs are transmitted and an offset ($\Delta_{CSI-RS}$) may be determined. The CSI-RS sub-frame configuration in Table 4 may be one of the 'SubframeConfig' field or 'ZeroTxPowerSubframeConfig' field of the CSI-RS-Config IE in Table 1. The CSI-RS sub-frame configuration may be separately made for non-zero power CSI-RSs and zero power CSI-RSs.

Meanwhile, FIG. 8 illustrates resource elements used for CSI-RSs when the CSI-RS configuration index is 0 in normal CP. Rp denotes a resource element used for CSI-RS transmission on antenna port p. Referring to FIG. 10, CSI-RSs for antenna ports 15 and 16 are transmitted through the resource elements corresponding to the third subcarriers (subcarrier index 2) of the sixth and seventh OFDM symbols (OFDM symbol indexes 5 and 6) of the first slot. The CSI-RSs for antenna ports 17 and 18 are transmitted through resource elements corresponding to the ninth subcarriers (subcarrier index 8) of the sixth and seventh OFDM symbols (OFDM symbol indexes 5 and 6) of the first slot. The CSI-RSs for antenna ports 19 and 20 are transmitted through the same resource element where the CSI-RSs for antenna ports 15 and 16 are transmitted, and the CSI-RSs for antenna ports 21 and 22 are transmitted through the same resource element where the CSI-RSs for antenna ports 17 and 18 are transmitted.

When CSI-RSs are transmitted to the UE through eight antenna ports, the UE will receive RBs to which R15 to R22 are mapped. That is, the UE will receive a CSI-RS having a particular pattern.

Figure 9:
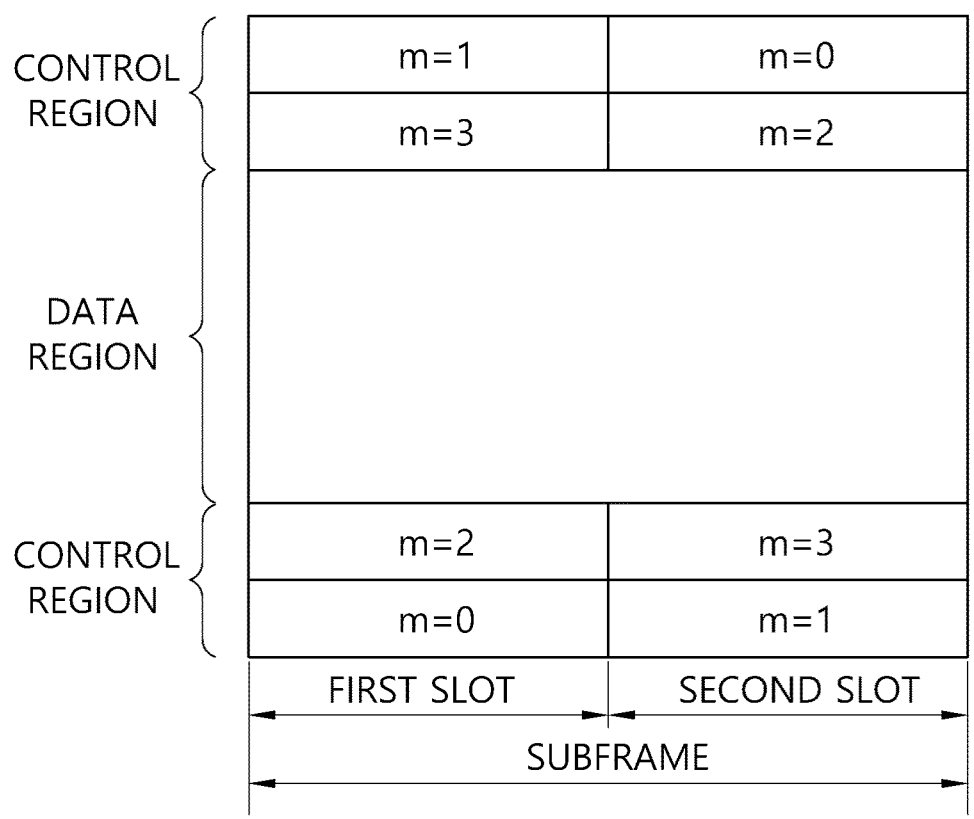
FIG. 9 illustrates a structure of an uplink subframe in the 3GPP LTE.

FIG. 9 illustrates the architecture of a UL sub-frame in 3GPP LTE.

Referring to FIG. 9, the uplink sub-frame may be separated into a control region and a data region in the frequency domain. The control region is allocated a PUCCH (physical uplink control channel) for transmission of uplink control information. The data region is allocated a PUSCH (physical uplink shared channel) for transmission of data (in some cases, control information may also be transmitted).

The PUCCH for one user equipment is allocated in resource block (RB) pair in the sub-frame. The resource blocks in the resource block pair take up different sub-carriers in each of the first and second slots. The frequency occupied by the resource blocks in the resource block pair allocated to the PUCCH is varied with respect to a slot boundary. This is referred to as the RB pair allocated to the PUCCH having been frequency-hopped at the slot boundary. A frequency diversity gain may be obtained by transmitting uplink control information through different sub-carriers over time.

Since the UE transmits UL control information over time through different subcarriers, a frequency diversity gain can be obtained. In the figure, m is a location index indicating a logical frequency-domain location of the RB pair allocated to the PUCCH in the sub-frame.

Uplink control information transmitted on the PUCCH may include a HARQ ACK/NACK, a channel quality indicator (CQI) indicating the state of a downlink channel, a scheduling request (SR) which is an uplink radio resource allocation request, and the like.

The PUSCH is mapped to an uplink shared channel (UL-SCH), a transport channel. Uplink data transmitted on the PUSCH may be a transport block, a data block for the UL-SCH transmitted during the TU. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

Hereinafter, a channel quality indicator (CQI) will be described. The CQI may be described with reference to Section 7.2.3 of 3GPP TS 36.213 V10.1.0 (2011-03).

First, the terminal may measure the CQI based on the CRS or CSI-RS.

A resource of the CSI-RS for the measurement may be defined as follows. In the frequency domain, the resource of the CSI-RS may be defined as a group of downlink PRBs corresponding to a band associated with a derived CQI value. In the time domain, the resource of the CSI-RS resource may be defined as one downlink subframe $n-n_{CQI\_ref}$. In the case of a periodic CSI report, $n_{CQI\_ref}$ may be equal to 4 or a smallest value which is larger than 4 and correspond to a valid downlink subframe. Alternatively, in an aperiodic CSI report, $n_{CQI\_ref}$ may allow the resource of the CSI-RS to be present in the same valid downlink subframe like a corresponding CSI request in an uplink DCI format. Alternatively, in the case of the aperiodic CSI report, $n_{CQI\_ref}$ may be equal to 4 and the downlink subframe $n-n_{CQI\_ref}$ may correspond to the valid downlink subframe. In this case, the downlink subframe $n-n_{CQI\_ref}$ may be received after a subframe in which the corresponding CSI request in a random access response grant is present.

The downlink subframe in the serving cell is regarded to be valid when the following conditions are satisfied.

1) the corresponding downlink subframe is constituted by downlink subframes for the corresponding terminal, 2) the corresponding downlink subframe is not in transmission mode 9 and not an MBSFN subframe, 3) when the length of DwPTS is equal to or smaller than 7680 Ts, the corresponding downlink subframe does not include a DwPTS field, 4) the corresponding downlink subframe is not present in the configured measurement gap for the corresponding terminal, and 5) In the periodic CSI report, in the case where the corresponding terminal is constituted by a CSI subframe set connected with the periodic CSI report, when the corresponding downlink subframe is an element of the CSI subframe set, the corresponding downlink subframe is regarded to be valid. When the valid downlink subframe for the resource of the CSI-RS in the serving cell is not present, the CSI report may be omitted in uplink subframe n.

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

Hereinafter, MTC will be described.

Figure 10A:
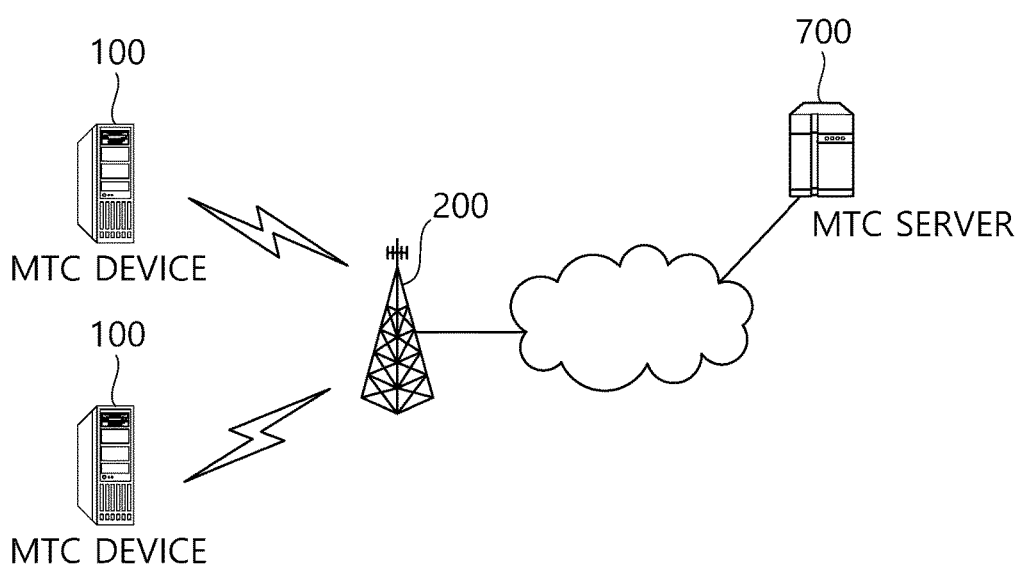
FIG. 10a illustrates one example of machine type communication (MTC).

FIG. 10a illustrates an example of machine type communication (MTC).

The MTC refers to information exchange performed between MTC devices 100 via a BS 200 without human interactions or information exchange performed between the MTC device 100 and an MTC server 700 via the BS.

The MTC server 700 is an entity for communicating with the MTC device 100. The MTC server 700 executes an MTC application, and provides an MTC-specific service to the MTC device.

The MTC device 100 is a wireless device for providing the MTC, and may be fixed or mobile.

A service provided using the MTC is differentiated from an existing communication service requiring human intervention, and its service range is various, such as tracking, metering, payment, medical field services, remote controlling, etc. More specifically, examples of the service provided using the MTC may include reading a meter, measuring a water level, utilizing a surveillance camera, inventory reporting of a vending machine, etc.

The MTC device is characterized in that a transmission data amount is small and uplink/downlink data transmission/reception occurs sometimes. Therefore, it is effective to decrease a unit cost of the MTC device and to decrease battery consumption according to a low data transmission rate. The MTC device is characterized of having a small mobility, and thus is characterized in that a channel environment does almost not change.

Figure 10B:
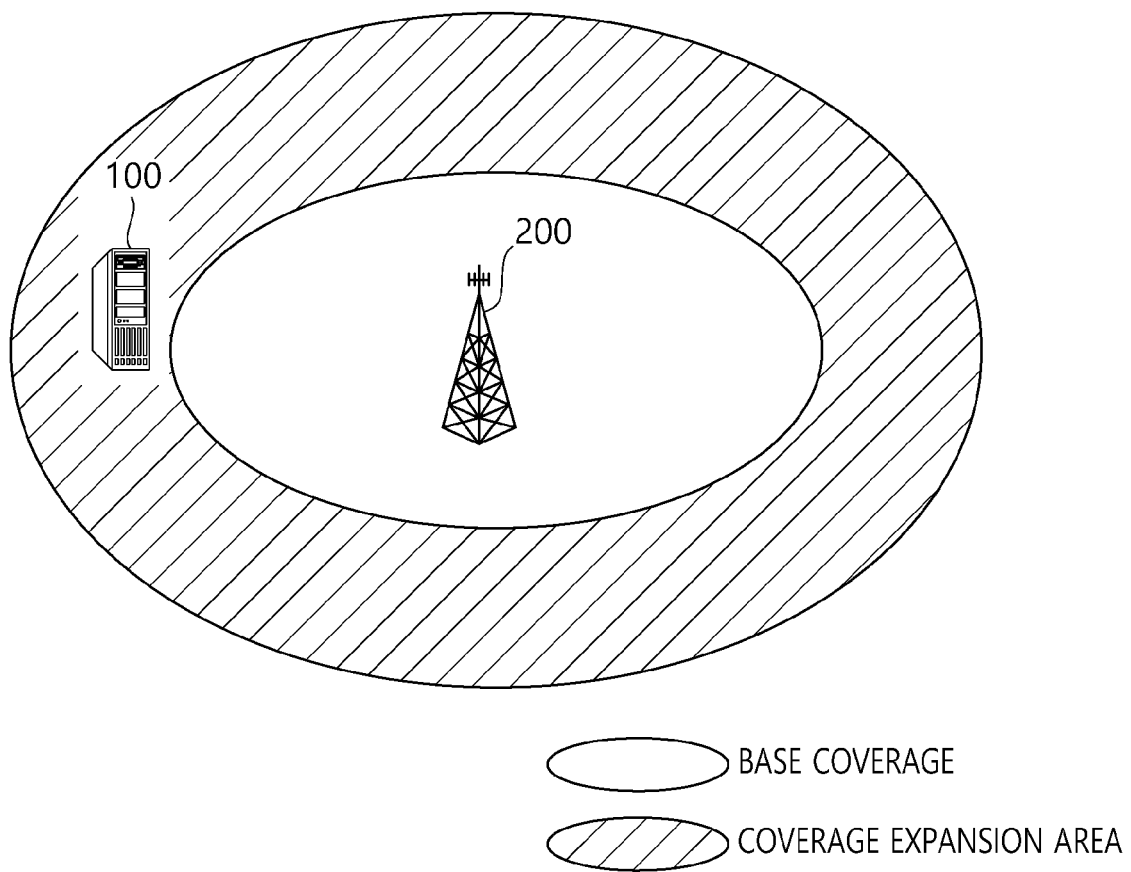
FIG. 10b is an example of cell coverage expansion for an MTC device.

FIG. 10b illustrates an example of cell coverage extension for an MTC device.

Recently, it is considered to extend cell coverage of a BS for an MTC device 100, and various schemes for extending the cell coverage are under discussion.

However, when the cell coverage is extended, if the BS transmits a PDSCH and a PDCCH including scheduling information for the PDSCH to the MTC device located in the coverage extension region as if it is transmitted to a normal UE, the MTC device has a difficulty in receiving this.

First Embodiment of Present Description

Accordingly, the first embodiment of the present description has been made in an effort to provide a scheme that solves the problem.

In order to solve the aforementioned problem, in one embodiment, of the present description, when the base station transmits the PDSCH and the PDCCH to the MTC device positioned in the coverage extension area, the base station repeatedly transmits the PDSCH and the PDCCH on various subframes (for example, bundling subframe). Accordingly, the MTC device receives a bundle of PDCCHs through various subframes and decodes the bundle of the PDCCHs to increase a decoding success rate. That is, the PDCCH may be successfully decoded by using some or all of the bundles of the PDCCHs received through various subframes. In other words, the MTC device couples and decodes the bundles of the PDCCHs in which the same PDCCH is repeated to increase the decoding success rate. Similarly, the MTC device receives the bundle of the PDCCHs through various subframes and decodes some or all of the bundles of the PDCCHs to increase the decoding success rate. Similarly, the MTC device that is positioned at a coverage expansion area may transmit a bundle of PUCCHs through various subframes. Similarly, the MTC device may transmit a bundle of PUSCHs through various subframes.

Figure 11A:
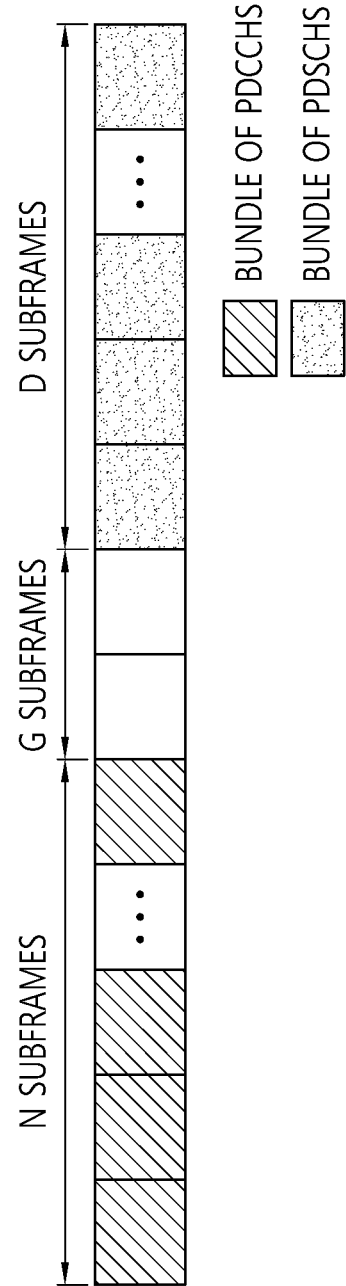
FIGS. 11a and 11b are exemplary diagrams illustrating an example in which a bundle of PDCCHs and a bundle of PDSCHs are transmitted.
Figure 11B:
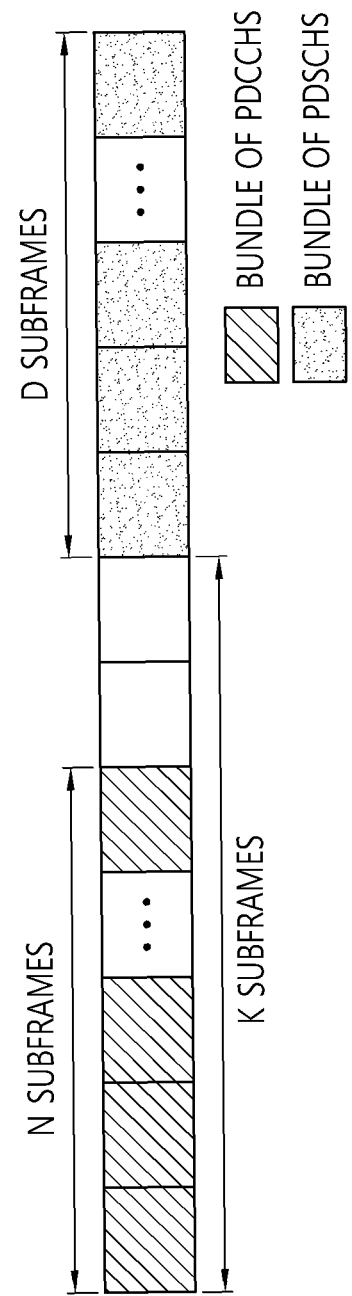

FIGS. 11a and 11b are Exemplary Diagrams Illustrating an Example in which a Bundle of PDCCHs and a Bundle of PDSCHs are Transmitted.

Referring to FIG. 11a, the base station may transmit the bundle of the PDCCHs in which the same PDCCH is repeated on a plurality of (for example, N) subframes for the MTC device that is positioned at the coverage expansion area. Further, the base station may transmit the bundle of the PDSCHs in which the same PDSCH is repeated on a plurality of (for example, D) subframes. In this case, after the transmission of the bundle of the PDCCHs is completed, the bundle of the PDSCHs may be transmitted after a predetermined gap, for example, G subframes.

Meanwhile, referring to FIG. 11b, the base station may transmit the bundle of the PDCCHs during N subframes for the MTC device that is positioned at the coverage expansion area and transmit the bundle of the PDSCHs by K subframes after the bundle of the PDCCHs starts during D subframes.

A position where the transmission of the bundle of the PDCCHs starts may not be free like the related art and the transmission may start only at a previously promised subframe position. The subframe position may be defined as a fixed value. In this case, the fixed value may be transferred to the MTC device through the MIB. For example, when it is assumed that the transmission of the bundle of the PDCCHs starts only at System Frame Number (SFN) % N=0, an N value (for example, N=20) may be transferred to the MTC device through the MIB. Alternatively, when it is assumed that the transmission of the bundle of the PDCCHs starts only at SFN % N=offset, a value of the offset may be transferred to the MTC device through the MIB. For example, the transmission of the PDCCHs for the MTC device that is positioned at the coverage expansion area may start only through a subframe corresponding to a multiple (#0, #100, #200, #300, and the like) of 100 or the position of the SFN. In this case, the MTC device may attempt to receive the PDCCH bundle through N subframes from the subframe corresponding to the multiple of 100 or the SFN position. Herein, the subframe position where the transmission of the PDCCH bundle may start may vary for each MTC device.

Second Embodiment of Present Description

On the other hand, when the MTC device considers that a transmission data amount is small and uplink/downlink data transmission/reception often occurs as described above, the manufacturing cost is reduced by lowering performance of the MTC device to thereby increase the supply rate. For example, the manufacturing cost of the MTC device is lowered by applying the half-duplex (HD) communication to thereby increase the supply rate. In this case, LTE/LTE-A is divided into a TDD scheme and an FDD scheme and the MTC device may use a half-duplex (HD) communication based FDD scheme.

Meanwhile, hereinafter, techniques that enable the half-duplex (HD) communication based FDD scheme (hereinafter, referred to as HD-FDD) will be described.

I. Switching Time in HD-FDD (Guard Period: GP)

When the HD-FDD is introduced, the MTC device needs to perform transmission and reception at different carrier frequencies. That is, the MTC device needs to tune an RF unit according to a downlink carrier frequency for the reception and tune the RF unit according to an uplink carrier frequency for the transmission.

A. Configuration 1 of Switching Subframe

When the MTC device attempts to perform reception on the downlink carrier and thereafter, perform transmission on the uplink carrier, the MTC device needs to switch or transit the frequency and perform timing advance (TA) in which uplink transmission is performed by advancing a downlink reception timing according to a distance from the base station, and as a result, a time of at least 2 msec may be consumed/required.

On the contrary, in the case where the downlink carrier frequency and the uplink carrier frequency are positioned different bands (inter-band), when the MTC device attempts to perform transmission on the uplink carrier and thereafter, perform reception on the downlink carrier, a time of at least 1 msec is consumed/required to switch or transit the frequency.

Hereinafter, this will be described with reference to FIGS. 12a and 12b.

Figure 12A:
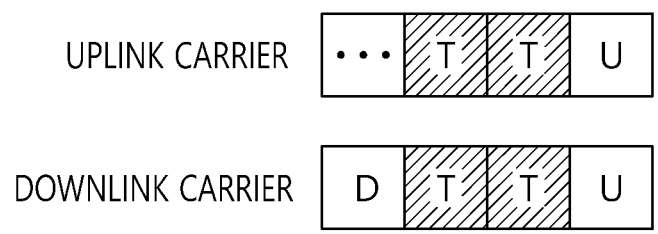
FIGS. 12a and 12b are examples illustrating an HD FDD operation on a downlink carrier and an uplink carrier.
Figure 12B:
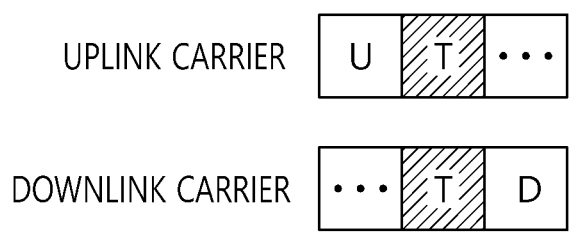

FIGS. 12a and 12b are Examples Illustrating an HD FDD Operation on a Downlink Carrier and an Uplink Carrier.

As known with reference to FIG. 12a, in the case where the MTC device attempts to perform reception on the downlink carrier and thereafter, perform transmission on the uplink carrier, when switching or transiting the frequency or performing the TA is considered, the time of at least 2 msec is consumed/required.

That is, as illustrated in FIG. 12a, two subframes may be provided as switching subframes between the downlink subframe and the uplink subframe.

On the contrary, as known with reference to FIG. 12b, in the case where the MTC device attempts to perform transmission on the uplink carrier and thereafter, perform transmission on the downlink carrier, when switching or transiting the frequency or performing the TA is considered, the time of at least 1 msec is consumed/required to switch or transit the frequency.

That is, as illustrated in FIG. 12a, one subframe may be provided as the switching subframe between the downlink subframe and the uplink subframe.

The switching subframes illustrated in FIGS. 12a and 12b may be defined as the guard period (GP). A downlink/uplink signal (or channel) may not be transmitted/received during the switching subframe, that is, the guard period and used for the MTC device to perform switching from the downlink to the uplink and match an uplink transmission timing.

B. Configuration 2 of Switching Subframe

As described above, when the HD-FDD operation is performed, the time of at least 1 msec is required as a switching time when the MTC device switches from the downlink reception to the uplink transmission, but even 1 msec is not required at the time of performing the TA. Moreover, as known with reference to FIG. 3, all special subframes of 1 msec are not configured as the guard period in the TDD and some special subframes are used as DwPTS and UpPTS of the OFDM symbols. In this case, as the guard period (that is, guard period=1 msec−DwPTS−UpPTS) of the special subframe is known through Table 3 given above, when the normal CP is used, a length of a minimum of 1 OFDM symbol to a length of a maximum of 10 OFDM symbols are present according to the configuration of the special subframe in the case of using the normal CP.

Accordingly, according to the embodiment, when the MTC device switches from the downlink to the uplink in the HD-FDD, it is proposed that the DwPTS, the guard period, and the UpPTS which are configured by a total of 2 msec are provided between the downlink subframe and the uplink subframe. This will be described below with reference to FIGS. 13a and 13b.

Figure 13A:
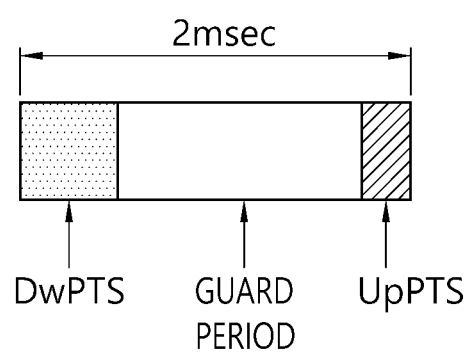
FIGS. 13a and 13b are exemplary diagrams illustrating a guard period for HD-FDD.
Figure 13B:
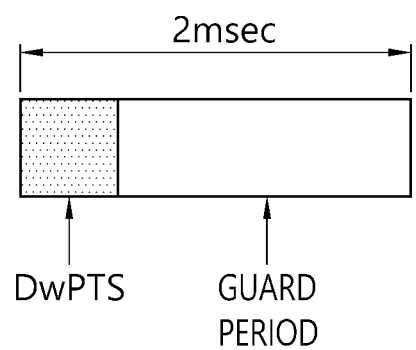

FIGS. 13a and 13b are Exemplary Diagrams Illustrating a Guard Period for HD-FDD.

Referring to FIG. 13a, as described above, the switching subframe of 2 msec is provided between the downlink subframe and the uplink subframe and the switching frame may include the DwPTS, the guard period, and the UpPTS. In this case, distinctively, the lengths of the DwPTS and the UpPTS may be configured to be the same as the length in the TDD as shown in Table 2 given above.

Alternatively, as known with reference to FIG. 13b, the switching subframe configured by a total of 2 msec is provided between the downlink subframe and the uplink subframe and the switching frame may include the DwPTS and the guard period. In this case, the length of the DwPTS may be the same as the length in the TDD as shown in Table 2. Alternatively, the length of the DwPTS may be the same as a length acquired by summing up the lengths of the DwPTS and the UpPTS in Table 2.

Meanwhile, when the MTC device switches from the uplink to the downlink, the switching subframe configured by a total of 1 msec, that is, the guard period is provided between the uplink subframe and the downlink subframe and the corresponding switching subframe may include only the guard period.

C. Guard Period for Switching from Downlink Reception to Uplink Transmission and Switching from Uplink Transmission to Downlink Reception When an HD-FDD MTC device for low complexity (low-price) includes a single oscillator, a guard period of at least 1 msec may be required for switching from the downlink reception to the uplink transmission to switching from the downlink transmission to the downlink reception.

The guard period may be generated when the MTC device does not downlink-receive a last part on a downlink subframe preceding the subframe, that is, the downlink sub-frame immediately before the uplink subframe. In detail, this will be described with reference to FIGS. 14a and 14b.

Figure 14A:
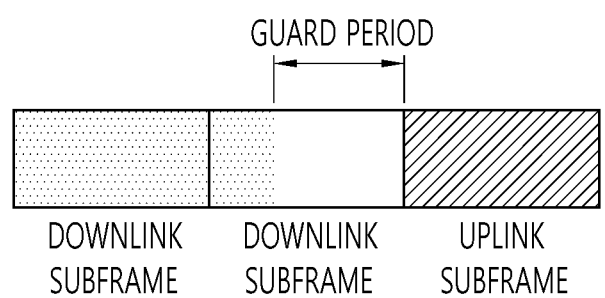
FIGS. 14a and 14b are another exemplary diagrams illustrating the guard period for the HD-FDD.
Figure 14B:
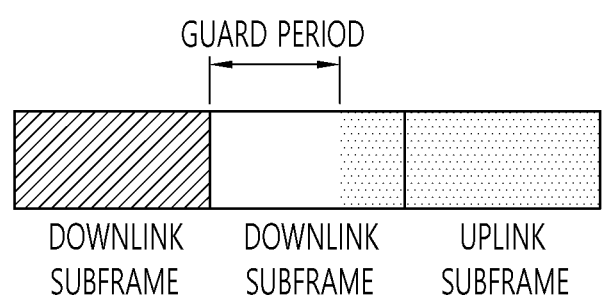

FIGS. 14a and 14b are Another Exemplary Diagrams Illustrating the Guard Period for the HD-FDD.

As known with reference to FIG. 14a, a guard period required when the MTC device intends to perform the switching from the downlink reception to the uplink transmission may be generated when the MTC device does not receive the last part of the downlink subframe before the uplink subframe. Alternatively, the MTC device does not receive all downlink subframes before the uplink subframe to generate the guard period.

Similarly, as known with reference to FIG. 14b, a guard period required when the MTC device intends to perform the switching from the uplink transmission to the downlink reception may be generated by not receiving a head part of the downlink subframe immediately after the uplink subframe. Alternatively, the MTC device does not receive all downlink subframes after the uplink subframe to generate the guard period.

Meanwhile, for example, when the MTC device uses subframes n, n+1, and n+2 as the uplink, downlink, and uplink subframes (that is, the MTC device is allocated with the subframes n, n+1, and n+2 as the uplink, downlink, and uplink subframes from the serving cell), the guard period may not be generated in the downlink subframe positioned in the subframe n+1. Alternatively, in the subframe n+1, the MTC device may not perform a downlink operation. That is, in the subframe n+1, the MTC device may not receive the downlink channel/signal. The reason is that when the guard period is generated in the n+1-th downlink subframe for switching the n-th uplink to the n+1-th downlink subframe and the guard period is generated in the n+1-th downlink subframe for switching the n+1-th downlink subframe to the n+2-th uplink subframe again, the MTC device may not receive most or all of the n+1-th downlink subframes. Alternatively, when the MTC device uses both the n-th subframe and the n+2-th subframe as the uplink subframe (that is, the MTC device is allocated with both the n-th subframe and the n+2-th subframe from the serving cell through the uplink), the guard period may not be generated between two corresponding downlink subframes including the n+1-th subframe. Alternatively, in the n+1-th subframe, the MTC device may not receive the downlink channel/signal.

On the other hand, for example, when the MTC device uses the n-th subframe, the n+1-th subframe, and the n+2-th subframe as the uplink, the downlink and the uplink, respectively (that is, the MTC device is allocated with the n-th subframe, the n+1-th subframe, and the n+2-th subframe as the uplink, the downlink and the uplink, respectively) the uplink operation may be performed by considering/assuming that the downlink subframe which is the n+1-th subframe as the uplink subframe. Alternatively, when the MTC device uses both the n-th subframe and the n+2-th subframe as the uplink subframe, the uplink operation may be performed by considering/assuming the subframe n+1 as the uplink subframe.

According to the same principle, when the MTC device uses the n-th, n+1-th, and n+2-th subframes as the uplink, the downlink, and downlink subframes, respectively, the guard period may be generated in the downlink subframe positioned in the subframe n+1.

Similarly, according to the same principle, when the MTC device uses the n-th, n+1-th, n+2-th, and n+3-th subframes as the uplink, downlink, downlink, and uplink subframes, respectively, the guard period may be generated in the downlink subframes positioned in the n+1-th and n+2-th subframes. Alternatively, in the n+1-th and n+2-th subframes, the MTC device may not receive the downlink channel/signal. The reason is that when the guard period is generated in the n+1-th downlink subframe for switching the n-th uplink to the n+1-th downlink subframe and the guard period is generated in the n+2-th downlink subframe for switching the n+2-th downlink subframe to the n+3-th uplink subframe again, the MTC device may not receive most or all of the n+1-th and n+2-th downlink subframes corresponding to the downlink. Alternatively, when the MTC device uses all of the n-th and n+3-th subframes, as the uplink subframes, the guard period may not be generated on the n+1-th and n+2-th downlink subframes that are present between the n-th and n+3-th uplink subframes. Alternatively, in the n+1-th and n+2-th subframes, the MTC device may not receive the downlink channel/signal.

Further, when the MTC device uses the n-th, n+1-th, n+2-th, and n+3-th subframes as the uplink, downlink, downlink, and uplink subframes, respectively, the uplink operation may be performed by considering/assuming the n+1-th and n+2-th subframes as the uplink subframes. Alternatively, when the MTC device uses both the n-th subframe and the n+3-th subframe as the uplink subframes, the uplink operation may be performed by considering/assuming the n+1-th and n+2-th subframes as the uplink subframes.

D. PDCCH-Subframe for HD-FDD

In general, the subframe including the PDCCH is referred to as the PDCCH subframe. In the case of the FDD, a predetermined subframe may be referred to as the PDCCH subframe, but in the case of the TDD, when simultaneous transmission/reception with a plurality of cells is available by carrier aggregation (CA), a subframe including the DwPTS of all cells other than the serving cell in which schedulingCellId is configured may be referred to as the PDCCH subframe. Alternatively, the PDCCH subframe may mean a downlink subframe of a primary cell Pcell or a subframe including the DwPTS in the carrier aggregation (CA).

When a subframe corresponding to the PDCCH subframe is not used for the uplink transmission for the HD-FDD and the corresponding subframe is not a part of the measurement gap, the MTC device may monitor the PDCCH during the active time.

In this case, under an HD-FDD environment, in the downlink subframe in which the guard period for switching from the downlink reception to the uplink transmission is present, the guard period may be long so as not to receive the PDCCH.

That is, for example, when the guard period is 1 msec which is one subframe length, any channel/signal may not be received in the entirety of one subframe.

As another example, the guard period is smaller than 1 msec which is the length of one subframe, but the PDCCH may not be received. This will be exemplarily described below with reference to FIG. 15.

Figure 15:
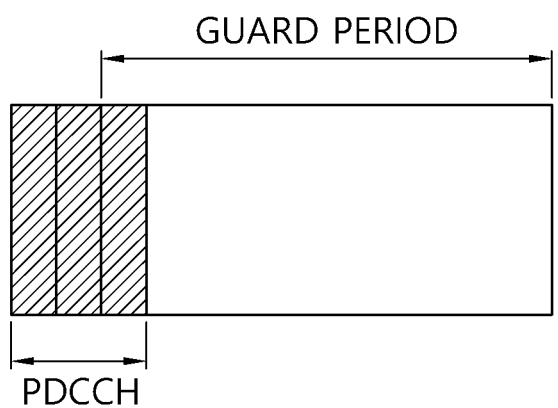
FIG. 15 is an exemplary diagram illustrating an example in which the PDCCH cannot be received due to the guard period.

FIG. 15 is an Exemplary Diagram Illustrating an Example in which the PDCCH Cannot be Received Due to the Guard Period.

As known with reference to FIG. 15, 12 OFDM symbols or more are required as the guard period in the normal CP, but when the PDCCH is received on 3 OFDM symbols, the PDCCH may not be normally received on some symbols. In this case, the PDCCH may not be received in the corresponding downlink subframe. Accordingly, under the HD-FDD environment, a downlink subframe in which the PDCCH may not be received due to the guard period may be excluded from the PDCCH-subframe.

In this case, a remaining time domain or OFDM symbol region other than the guard period in the downlink subframe may be defined as HD-DwPTS. This will be described with reference to FIG. 16.

Figure 16:
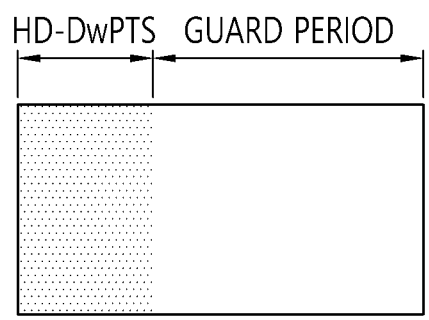
FIG. 16 is an exemplary diagram illustrating one subframe including the guard period.

FIG. 16 is an Exemplary Diagram Illustrating One Subframe Including the Guard Period.

Referring to FIG. 16, the remaining time domain or OFDM symbol region other than the guard period in the downlink subframe may be defined as the HD-DwPTS.

In this case, in a general downlink subframe in which the guard period is not present, the length of the HD-DwPTS are 14 OFDM symbols in the case of the normal CP and 12 symbols, that is, 1 msec in the case of the extended CP. If the guard period is 1 msec in a specific downlink subframe, the HD-DwPTS becomes 0 OFDM symbol or 0 msec.

Meanwhile, the existing definition for the PDCCH-subframe may be enhanced by one or more combinations of the following contents under the HD-FDD environment.

a) the downlink subframe in which the guard period is not present b) a downlink subframe in which the guard period is equal to or smaller than X OFDM symbols (alternatively, a time length corresponding to X OFDM symbols) (for example, X=11)

c) a downlink subframe in which the guard period is equal to or larger than X OFDM symbols (alternatively, the time length corresponding to X OFDM symbols) (for example, X=11)

d) any downlink subframe in which the guard period is equal to or smaller than X OFDM symbols (alternatively, the time length corresponding to X OFDM symbols) (for example, X=11)

e) a downlink period in which the guard period does not invade the PDCCH transmission OFDM symbol region f) a downlink subframe in which the length of the HD-DwPTS is 1 msec (alternatively, 14 OFDM symbols of the normal CP or 12 symbols of the extended CP)

g) a downlink subframe in which the length of the HD-DwPTS is equal to or larger than Y OFDM symbols (alternatively, a time length corresponding to Y OFDM symbols) (for example, Y=3)

h) a downlink subframe in which the PDCCH may be transmitted during the HD-DwPTS In this case, in the DRX, a subframe (non-PDCCH-monitoring subframe) used as the guard period may not be included in the active time.

For example, in the case where the n-th, n+1-th, and n+2-th subframes are configured as the uplink, the downlink, and the uplink, respectively, when the MTC device does not perform the downlink reception according to an embodiment in the downlink subframe present between both uplink subframes, the corresponding downlink subframe may be excluded from the PDCCH-subframe. Similarly, when the n-th, n+1-th, n+2-th, and n+3-th subframes are configured as the uplink, the downlink, the downlink, the downlink, and the uplink, respectively (that is, when the n-th and n+3-th subframes are configured as the uplink), the downlink subframes present between both uplink subframes may also be excluded from the PDCCH-subframe.

In this case, when the PDCCH-subframes recognized by the serving cell and the MTC device are not the same as each other, even though the MTC device receives the PDCCH in a specific downlink subframe, the serving cell may make a mistake to determine that the MTC device may not receive the PDCCH due to the guard period. For example, it is assumed that the MTC device uses one OFDM symbol as the guard period, but the serving cell uses one subframe, an assumption for the PDCCH-monitoring subframe may vary between the MTC device and the serving cell. The inconsistency may influence the operation such as the DRX, or the like. In order for the serving cell to definitely know the PDCCH-subframe of the MTC device, the serving cell and the MTC device need to assume the same guard period. To this end, it is proposed that the following method is used.

a) The serving cell and the MTC device may continuously assume the guard period as a specific value. For example, the serving cell and the MTC device may continuously assume the guard period as 1 msec. Alternatively, the serving cell may announce information on the guard period to the MTC device through an upper layer signal. In this case, the upper layer signal may be a form of a TDD special subframe configuration. Alternatively, the serving cell may announce the information on the guard period to the MTC device through the TDD special subframe configuration. In this case, it may be assumed that the serving cell and the MTC device uses only the guard period and the UpPTS is not present. Accordingly, it may be assumed that the OFDM symbol used in the UpPTS is used as the downlink.

b) Alternatively, the MTC device may announce the guard period required therefor to the serving cell. Information on the guard period required for the MTC device may be transmitted through scheduling transmission (also referred to as Msg 3) after receiving the random access response. Alternatively, the information on the guard period required for the MTC device may be transmitted through PUSCH/RRC or capability information. Even when the MTC device personally announces the information on the guard period, the serving cell may set a value of the guard period and announce the set value to the MTC device.

On the other hand, the definition of the active time may be changed without changing a definition of the PDCCH subframe. In this case, the active time may be defined as follows. In this case, in the DRX cycle, the active time may include the subframe used as the guard period, but the MTC device may not perform the PDCCH monitoring.

a) When the subframe corresponding to the PDCCH subframe is not used for the uplink transmission for the HD-FDD, the size of the HD-DwPTS is larger than x (for the normal CP) or y (for the extended CP), and the corresponding subframe is not a part of the measurement gap, the MTC device may monitor the PDCCH during the active time.

b) When the subframe corresponding to the PDCCH subframe is not used for the uplink transmission for the HD-FDD, the corresponding subframe is not a guard subframe for the HD, and the corresponding subframe is not a part of the measurement gap, the MTC device may monitor the PDCCH during the active time.

For example, when the n-th, n+1-th, and n+2-th subframes are configured as the uplink, the downlink, and the uplink, respectively, (that is, when the n-th and n+2-th subframes are configured as the uplink), since the downlink subframe present between both uplink subframes includes the guard period, the MTC device may not perform the downlink reception according to an embodiment and furthermore, not perform even the PDCCH on the downlink subframe. As another example, when the n-th, n+1-th, n+2-th, and n+3-th subframes are configured as the uplink, the downlink, the downlink, and the uplink, respectively, (that is, when the n-th and n+3-th subframes are configured as the uplink), since the downlink subframe present between both uplink subframes includes the guard period, the MTC device may not perform the downlink reception according to an embodiment and furthermore, not perform even the PDCCH on the downlink subframe.

This will be described below with reference to the drawing.

Figure 17:
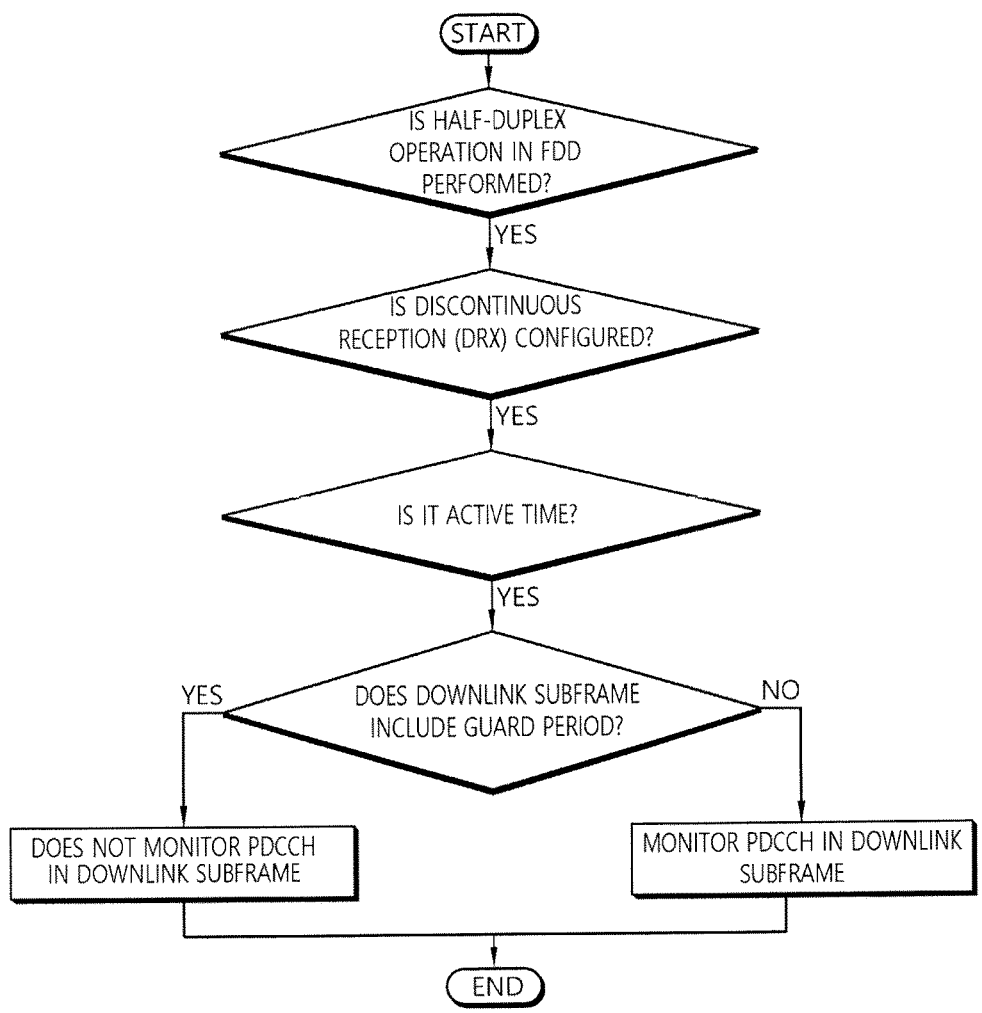
FIG. 17 is a flowchart illustrating a method according to an embodiment.

FIG. 17 is a Flowchart Illustrating a Method According to an Embodiment.

As known with reference to FIG. 17, when the MTC device operates with a half duplex in the FDD, the MTC device verifies whether the DRX is configured. When the DRX is configured, it is determined whether the present time is the active time. When the present time is the active time, it is verified whether the current downlink subframe includes the guard period. That is, it is determined whether a time immediately after the downlink subframe is the uplink subframe. Alternatively, it is determined whether a time immediately after the downlink subframe is the uplink subframe. When the current downlink subframe includes the guard period, the PDCCH is not monitored on the corresponding downlink subframe. However, when the current downlink subframe does not include the guard period, the PDCCH is monitored on the corresponding downlink subframe.

II. CQI Measurement Using CSI-RS

As described above with reference to FIGS. 8 and 9, the CQI may be measured based on the CRS or CSI-RS. Hereinafter, measuring the CQI based on the CSI-RS will be primarily described.

As illustrated in FIG. 14*a* above, when the MTC device uses the last part of the downlink subframe before the uplink subframe as the guard period (GP) in order to perform switching the reception to the transmission (Rx-to-Tx switching) under the HD-FDD environment, the MTC device may not sufficiently receive the CRS or CSI-RS during the guard period. Similarly, as illustrated in FIG. 14*b*, when the MTC device uses the head part of the downlink subframe after the uplink subframe as the guard period (GP) in order to perform switching the transmission to the reception under the HD-FDD environment, the MTC device may not sufficiently receive the CRS or CSI-RS during the guard period.

Accordingly, it may be preferable that the downlink subframe in which the guard period is present is not designated as the valid downlink subframe for measuring the CQI according to the length of the guard period. Accordingly, according to the embodiment, it is proposed that when it is difficult to normally perform the CQI measurement (that is, when the CRS or CSI-RS RE may not be sufficiently received), the corresponding subframe is excluded from the valid downlink subframe.

Consequently, according to the embodiment, the valid downlink subframe for deciding the CSI-RS resource may include the following conditions.

a) the downlink subframe not used as the guard period (in which the guard period is not present)

b) a downlink subframe not including a guard period which is equal to or larger than X msec (Y OFDM symbols)

c) a downlink subframe not including a guard period which is equal to or smaller than X msec (Y OFDM symbols)

d) a downlink subframe capable of receiving all (alternatively, several or more per PRB) CRS REs (alternatively, CSI-RS REs)

e) a downlink subframe in which the length of the HD-DwPTS is equal to or larger than X msec (Y OFDM symbols)

f) a downlink subframe in which the length of the HD-DwPTS is not equal to or smaller than X msec (Y OFDM symbols)

For example, when the n-th, n+1-th, and n+2-th subframes are configured as the uplink, the downlink, and the uplink, respectively (that is, when the n-th and n+2-th subframes are configured as the uplink, since the MTC device does not receive the downlink channel/signal in the downlink subframe present between both uplink subframes according to the embodiment, the downlink subframe may also be excluded from the valid subframe for measuring the CQI or CSI. Similarly, when the n-th, n+1-th, n+2-th, and n+3-th subframes are configured as the uplink, the downlink, the downlink, the downlink, and the uplink, respectively (that is, when the n-th and n+3-th subframes are configured as the uplink), the downlink subframes present between both uplink subframes may also be excluded from the valid subframe for measuring the CQI or CSI.

III. Collision Problem Between Downlink Channel and Uplink Channel

Under the HD-FDD environment, a problem may occur, in which a downlink channel needs to be received on a subframe in which the uplink channel/signal needs to be transmitted or a problem may occur, in which the downlink channel needs to be received in a subframe in which the reception needs to be switched to the transmission for the uplink transmission. For example, a situation may occur, in which a PHICH/SPS needs to be received in a subframe in which a PUCCH (CSI report)/SRS/PRACH needs to be transmitted or a subframe in which switching the reception to the transmission (Rx-to-Tx) needs to be performed.

Hereinafter, an MTC device operation when the collision occurs between the downlink channel and the uplink channel will be proposed.

A. Collision Between PUCCH and PHICH

Since the MTC device needs to receive the PHICH at a timing (that is, subframe) when the PUCCH including a periodic/aperiodic CSI report needs to be transmitted, the PUCCH and the PHICH may collide with each other at the same timing (that is, subframes at the same position). Alternatively, since the MTC device needs to receive the PHICH at a timing (that is, a subframe including the guard period) when the reception needs to be switched to the transmission, the guard period and the PHICH may collide with each other at the same timing (that is, subframes at the same position).

Figure 18A:
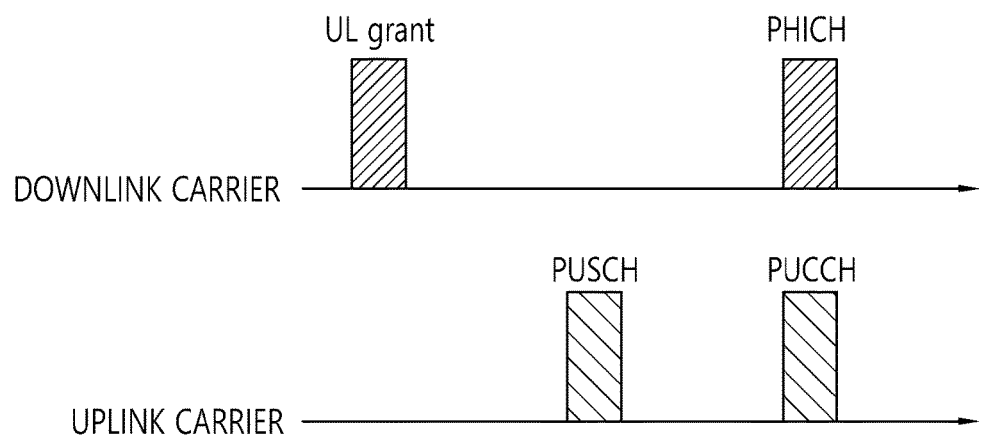
FIGS. 18a and 18b illustrate an example in which a PUCCH and a PHICH collide with each other.
Figure 18B:
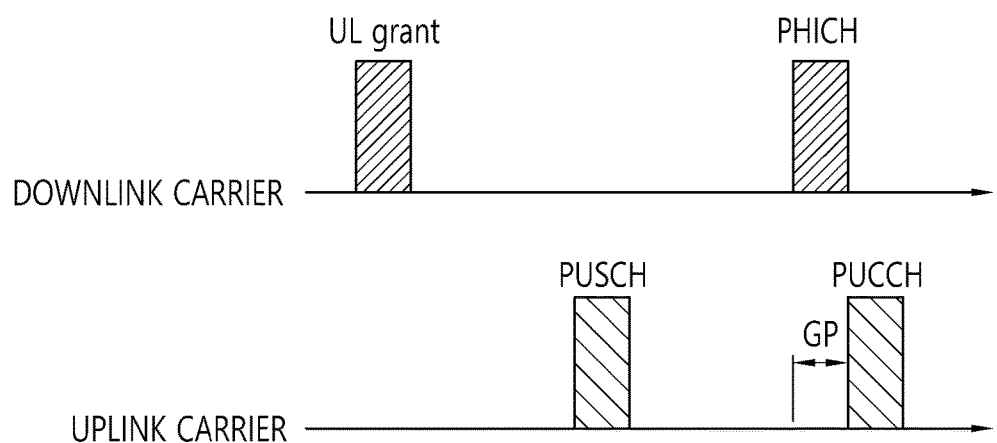

FIGS. 18a and 18b Illustrate an Example in which a PUCCH and a PHICH Collide with Each Other.

As illustrated in FIG. 18a, since the MTC device needs to transmit the PUSCH to the serving cell and thereafter, transmit the PUCCH including the periodic/aperiodic CSI report at a timing (alternatively, a subframe) when the MTC device needs to receive the PHICH for the PUSCH, the PHICH and the PUCCH may collide with each other at the same timing (that is, subframe). Alternatively, since the MTC device needs to receive the PHICH at a timing (that is, a subframe including the guard period) when the reception needs to be switched to the transmission in order to transmit the PUCCH including the periodic/aperiodic CSI report as illustrated in FIG. 18b, the guard period and the PHICH may collide with each other at the same timing (that is, subframes at the same position).

It is proposed that the MTC device operates as below in order to solve the collision.

a) The MTC device does not transmit the PUCCH including the CSI report and receives the PHICH. The MTC device may transmit the CSI report when a subsequent CSI report timing is reached or when there is a periodic CSI report request.

b) The MTC device may not receive the PHICH but transmit the PUCCH. In this case, it may be assumed that the MTC device receives the NACK instead of decoding the PHICH. Therefore, the MTC device may thereafter retransmit the PUSCH.

B. Collision Between PUCCH and SPS PDSCH

Since the MTC device needs to receive a semi-persistent scheduling (SPS) PDSCH from the serving cell at the timing (alternatively, subframe) when the MTC device needs to transmit the PUCCH including the periodic/aperiodic CSI report, the PUCCH and the SPS PDSCH may collide with each other at the same timing (subframe). Alternatively, since the MTC device needs to receive the SPS PDSCH at the timing (that is, the subframe including the guard period) when the reception needs to be switched to the transmission in order to transmit the PUCCH including the periodic/aperiodic CSI report, the guard period and the SPS PDSCH may collide with each other at the same timing (that is, the subframes at the same position). For example, a situation may occur, in which the SPS PDSCH is scheduled by the serving cell at the time (that is, subframe) when the MTC device needs to transmit the PUCCH including the periodic CSI report to the serving cell. Alternatively, a situation may occur, in which the MTC device needs to transmit the PUCCH including the periodic CSI report in a next subframe of the subframe in which the SPS PDSCH is scheduled. In this case, a case may occur, in which the MTC device may not perform both the reception of the SPS PDSCH and the transmission of the PUCCH due to the guard period in which the reception is switched to the transmission in order to transmit the PUCCH.

It is proposed that the MTC device operates as below in order to solve the collision.

a) The MTC device does not transmit the PUCCH including the CSI report and receives the SPS PDSCH. The MTC device may transmit the CSI report at a subsequent CSI report timing or when there is an aperiodic CSI report request.

b) The MTC device may not receive the SPS PDSCH but transmit the PUCCH. In this case, the MTC device may transmit the NACK through the PUCCH by assuming that the MTCI device may not successfully receive the corresponding SPS PDSCH instead of the SPS PDSCH.

C. Collision Between SRS and PHICH

Since the MTC device needs to receive the PHICH from the serving cell at a timing when the MTC device needs to transmit a sounding reference signal (SRS), the SRS and the PHICH may collide with each other at the same timing (that is, subframe). Alternatively, since the MTC device needs to receive the PHICH at a timing (that is, the subframe including the guard period) when the reception needs to be switched to the transmission in order to transmit the SRS, the guard period and the SRS may collide with each other at the same timing (that is, subframes at the same position).

It is proposed that the MTC device operates as below in order to solve the collision.

a) The MTC device does not transmit the SRS and receives the PHICH.

b) The MTC device may not receive the PHICH but transmit the SRS. In this case, it may be assumed that MTC device receives the NACK instead of decoding the PHICH. Therefore, the MTC device may thereafter retransmit the PUSCH.

D. Collision Between SRS and SPS PDSCH

Since the MTC device needs to receive the SPS PDSCH from the serving cell at the timing (alternatively, subframe) when the MTC device needs to transmit the SRS, the SRS and the SPS PDSCH may collide with each other at the same timing (subframe). Alternatively, since the MTC device needs to receive the SPS PDSCH at the timing (that is, the subframe including the guard period) when the reception needs to be switched to the transmission in order to transmit the SRS, the guard period and the SPS PDSCH may collide with each other at the same timing (that is, subframes at the same position).

It is proposed that the MTC device operates as below in order to solve the collision.

a) The MTC device does not transmit the SRS and receives the SPS PDSCH.

b) The MTC device may not receive the SPS PDSCH but transmit the SRS. In this case, the MTC device may transmit the NACK through the PUCCH by assuming that the MTCI device may not successfully receive the corresponding SPS PDSCH instead of the SPS PDSCH.

IV. HDD-FDD Operation for MTC Device of which Coverage Expansion is not Required A. Transmission of Control/Data Channel Considering Switching Time A-1. In Case of Applying Switching Subframe Configuration 1

Under the HD-FDD environment, when the downlink is switched to the uplink, in the case of applying the switching subframe (guard period) according to the configuration 1 of the switching subframe, it is proposed to set a limit on the transmission of the uplink/downlink control/data channel.

a) A downlink grant and/or uplink grant may be transmitted through a maximum of 2 consecutive subframes. When the MTC device receives the downlink grant or the uplink grant, the MTC device needs to transmit ACK/NACK information or PUSCH to the eNodeB through the uplink after 4 subframes. Hereinafter, this will be described with reference to FIG. 19a.

Figure 19A:
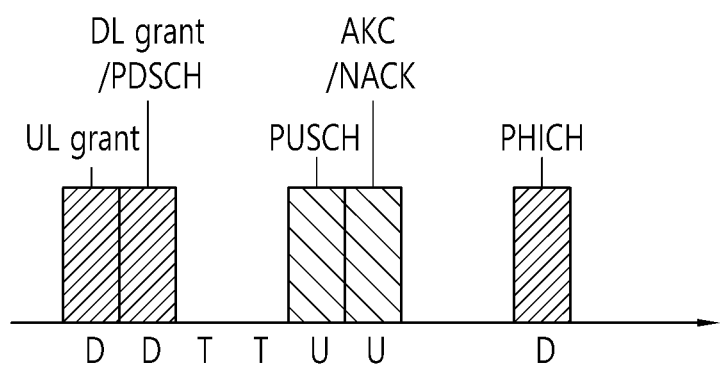
FIG. 19a is an exemplary diagram illustrating one example of an HD-FDD operation for an MTC device of which coverage expansion is not required.

FIG. 19a is an Exemplary Diagram Illustrating One Example of an HD-FDD Operation for an MTC Device of which Coverage Expansion is not Required.

As known with reference to FIG. 19a, since two subframes (2 msec) are required between the downlink subframe and the uplink subframe as the guard period for switching the downlink to the uplink, the downlink grant and/or the uplink grant may be transmitted through a maximum of two consecutive subframes. That is, the downlink control/data channel may be transmitted through a maximum of 2 consecutive subframes in order to reduce complexity.

b) When the downlink grant and/or the uplink grant are/is transmitted through a maximum of 2 consecutive subframes, the downlink control/data channel may be transmitted when at least 6 subframes elapse after transmitting the last grant. The reason is that when the last uplink/downlink grant is transmitted in subframe n, the A/N or PUSCH may be transmitted in subframe n+4 and the MTC device may perform the downlink after a switching time (that is, guard period) of 1 msec. Alternatively, when the downlink grant and/or the uplink grant are/is transmitted through a maximum of 2 consecutive subframes, the downlink control/data channel may be transmitted when at least 8 subframes elapse after transmitting the first grant. The reason is that when the downlink grant is transmitted in subframe n, the MTC device may transmit the A/N in subframe n+4 and when the MTC device transmits the NACK, retransmission may be anticipated after subframe n+8. Further, the reason is that when the uplink grant is transmitted in subframe n, the PUSCH is transmitted in subframe n+4 and the ACK/NACK for the corresponding PUSCH is transmitted through the PHICH in subframe n+8.

c) The MTC device may transmit the PUCCH and/or PUSCH through a maximum of 3 consecutive subframes. When the MTC device transmits the NACK to the PUCCH or PUSCH, the MTC device may be anticipated to retransmit the PDSCH after 4 subframes. Further, when the MTC device transmits the PUSCH, the MTC device may be anticipated to receive the PHICH from the serving cell. Hereinafter, this will be described with reference to FIG. 19b.

Figure 19B:
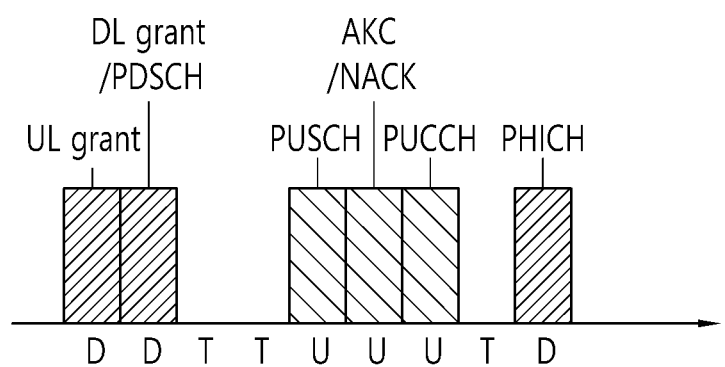
FIG. 19b is an exemplary diagram illustrating another example of the HD-FDD operation for the MTC device of which the coverage expansion is not required.

FIG. 19b is an Exemplary Diagram Illustrating Another Example of the HD-FDD Operation for the MTC Device of which the Coverage Expansion is not Required.

Since the switching time (guard period) corresponding to the length (1 msec) of one subframe is required between the uplink subframe and the downlink subframe in order to switch the uplink to the downlink, the PUCCH and/or PUSCH may be transmitted through a maximum of 3 consecutive subframes as illustrated in FIG. 19b. That is, the uplink control/data channel may be transmitted through a maximum of 3 consecutive subframes in order to reduce the complexity.

A-2. In Case of Applying Switching Subframe Configuration 2

Under the HD-FDD environment when the downlink is switched to the uplink, in the case of applying the switching subframe (guard period) according to the configuration 2 of the switching subframe, the PDCCH may be transmitted during the DwPTS of the switching frame and the EPDCCH and/or the PDSCH may also be transmitted according to the length of the DwPTS.

In this case, it is proposed to set a limit on transmission of the uplink/downlink control/data channel.

a) The downlink grant and/or uplink grant may be transmitted through a maximum of 3 consecutive subframes. When the MTC device receives the downlink grant or the uplink grant, the MTC device needs to transmit the ACK/NACK information or PUSCH to the serving cell through the uplink after 4 subframes. Hereinafter, this will be described with reference to FIG. 20.

Figure 20:
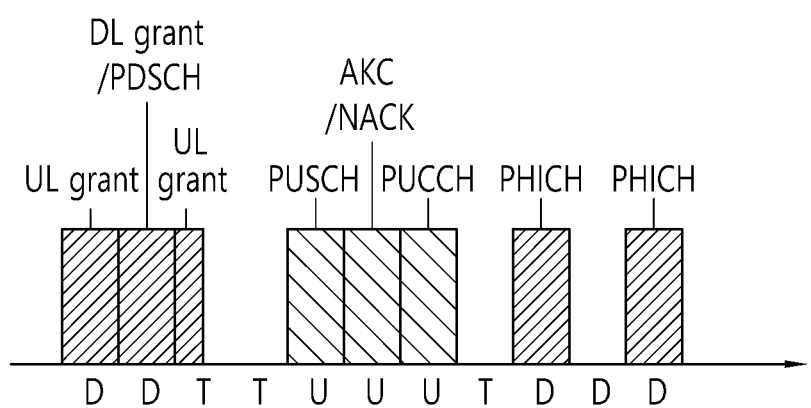
FIG. 20 is an exemplary diagram illustrating yet another example of the HD-FDD operation for the MTC device of which the coverage expansion is not required.

FIG. 20 is an Exemplary Diagram Illustrating Yet Another Example of the HD-FDD Operation for the MTC Device of which the Coverage Expansion is not Required.

As illustrated in FIG. 20, two switching subframes (marked with T) are required between the downlink subframe and the uplink subframe. Whether the downlink grant may be transmitted in the switching subframe varies depending on the length of the DwPTS. When the DwPTS is short, the downlink grant may not be transmitted through the switching subframe. However, the uplink grant may be continuously transmitted during the DwPTS. When the PDCCH may be transmitted in the switching subframe unlike the case of applying the switching subframe configuration 1, the downlink grant and/or uplink grant may be transmitted through a maximum of 3 consecutive subframes. The downlink control/data channel may be transmitted through a maximum of 3 consecutive subframes in order to simplify the complexity.

b) Meanwhile, when the downlink grant and/or the uplink grant are/is transmitted through a maximum of 3 consecutive subframes, the downlink control/data channel may be transmitted when at least 6 subframes elapse after transmitting the last grant. The reason is that when the last uplink/ downlink grant is transmitted in subframe n, the A/N or PUSCH may be transmitted in subframe n+4 and the MTC device may perform the downlink after the switching time (that is, guard period) of 1 msec. Alternatively, when the downlink grant and/or the uplink grant are/is transmitted through a maximum of 3 consecutive subframes, the downlink control/data channel may be transmitted when at least 8 subframes elapse after transmitting the first grant. The reason is that when the downlink grant is transmitted in subframe n, the MTC device may transmit the A/N in subframe n+4 and when the MTC device transmits the NACK, retransmission may be anticipated after subframe n+8. Further, the reason is that when the uplink grant is transmitted in subframe n, the PUSCH is transmitted in subframe n+4 and the ACK/NACK for the corresponding PUSCH is transmitted through the PHICH in subframe n+8.

c) The MTC device may transmit the PUCCH and/or PUSCH through a maximum of 3 consecutive subframes. When the MTC device transmits the NACK to the PUCCH or PUSCH, the MTC device may anticipate retransmission of the PDSCH after 4 subframes. Further, when the MTC device transmits the PUSCH, the MTC device may be anticipated to receive the PHICH from the eNodeB after 4 subframes. In this case, since the guard period of one subframe (1 msec) is required between the uplink subframe and the downlink subframe, the PUCCH and/or PUSCH may be transmitted through a maximum of 3 consecutive subframes. The uplink control/data channel may be transmitted through a maximum of 3 consecutive subframes in order to simplify the complexity.

B. Operation Method of Setting Downlink as Base Status

As a method for operating the MTC device in the HD-FDD, it is proposed that the MTC device is fundamentally in a downlink status. In this case, the MTC device performs the downlink operation at the downlink carrier frequency except for a special situation. In this case, the MTC device may perform the uplink operation in the following situations.

i) Receiving the uplink grant: When the MTC device in the downlink status receives the uplink grant from the serving cell, the downlink status of the MTC device may be switched to the uplink status in order to transmit the PUSCH. In this case, when the MTC device receives the uplink grant in subframe n, the MTC device transmits the PUSCH in subframe n+4 and performs switching from the downlink to the uplink in subframes n+1 to n+3.

ii) Receiving downlink grant/downlink data: When the MTC device in the downlink status receives the downlink grant and the PDSCH from the serving cell, the downlink status of the MTC device may be switched to the uplink status in order to transmit the ACK/NACK information to the serving cell. In this case, when the MTC device receives the downlink grant/downlink data in subframe n, the MTC device transmits the ACK/NACK to the PUCCH or PUSCH in subframe n+4 and performs switching from the downlink to the uplink in subframes n+1 to n+3.

iii) Transmitting the PRACH: When the MTC device in the downlink status transmits the PRACH to the serving cell, the downlink status of the MTC device may be switched to the uplink status in order to transmit the PRACH without a separate command from the serving cell.

iv) Transmitting the scheduling request (SR): When the MTC device in the downlink status intends to transmit data to the serving cell, the MTC device may transmit the SR to the serving cell by the following methods.

iv-1) It is proposed to configure the uplink subframe to transmit the SR. A specific set of the subframes may be continuously present in the uplink status and the MTC device may transmit the SR through the corresponding subframe. The specific set may be configured from the serving cell through the SIB, RRC signal, and the like. The specific set may be defined as an offset value which is a period.

iv-2) The MTC device may be configured to transmit the SR to one antenna or two antennas through the upper layer signal and in this case, the MTC device may get a configuration of the period and the offset to transmit the SR through the upper layer signal together. The MTC device may transmit the SR at the position of the subframe to transmit the SR and the MTC device may be in the uplink status in the corresponding subframes.

iv-3) The MTC device may transmit the SR through the corresponding P UCCH together when transmitting the PUCCH to the serving cell. In this case, there is no separate SR transmittable subframe and the MTC device may transmit the SR in the case of transmitting the PUCCH to the serving cell.

d) The MTC device may not transmit the SR to the serving cell. Alternatively, the MTC device may not be configured to transmit the SR through the upper layer signal. In this case, the MTC device transmits the PRACH to request data transmission to the serving cell.

D. Subframe Pattern for Uplink and Downlink

Whether the MCT device using the HD-FDD uses each subframe as the downlink subframe or the uplink subframe may be naturally defined due to the scheduling of the serving cell. However, if the scheduling needs to be performed by considering the downlink/uplink timing of the MTC device having many serving cells, the scheduling complexity of the serving cell may be increased. Alternatively, a problem that the serving cell transmits unnecessary data by incorrectly recognizing the uplink/downlink status of the UE may be caused. In order to prevent the problem, whether each subframe of the specific MTC device is used as the uplink subframe or the downlink subframe may be pre-determined. That is, subframe patterns for downlink and uplink for the HD-FDD may be defined and used in advance.

Figure 21:
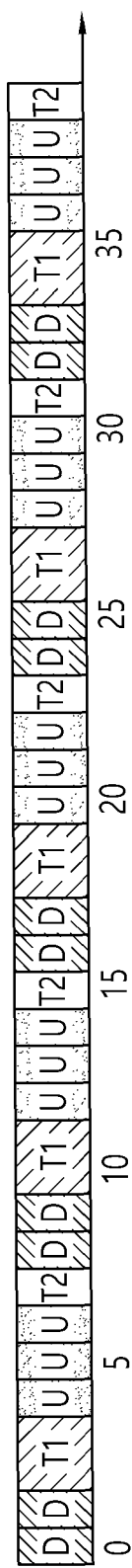
FIG. 21 illustrates one example of a downlink/uplink subframe pattern.

FIG. 21 Illustrates an Example of Downlink/Uplink Subframe Patterns.

Referring to FIG. 12, it is proposed that a subframe pattern having a period of 40 msec is used by considering the uplink/downlink switching time (guard time) of the MTC device using the HD-FDD. In FIG. 20, D means the downlink subframe and U means the uplink subframe. T1 means a switching time of 2 msec and may include DwPTS and the guard period or DwPTS, the guard period, and UpPTS. T2 means a switching time of 1 msec.

The subframe patterns may vary for each the MTC device. The subframe pattern of each MTC device may be configured to the MTC device through RAR or RRC signaling. Further, the subframe pattern may be dynamically changed through dynamic signaling. For example, the subframe pattern may be configured as one of TDD DL/UL configurations. Accordingly, for example, transmission timing of the HARQ-ACK and the PUSCH may be determined according to the TDD DL/UL configuration. Further, when the subframe which is not used due to the guard period is generated, the serving cell may announce the case to the MTC device in a bitmap form through the upper layer signaling.

V. HD-FDD Operation for MTC Device of which Coverage Expansion is Required

Hereinafter, when the coverage expansion is required, requirements for the HD-FDD operation of the MTC device will be described.

A. Transmissions Limited for Repeated Transmission

A-1. Limitation of Simultaneous Transmission of Downlink Grant and Uplink Grant

When the MTC device of which coverage expansion is required operates in the HD-FDD, it is proposed that the serving cell does not simultaneously transmit a downlink grant and an uplink grant. This means that the downlink grant and the uplink grant are not transmitted through the same subframe. Alternatively, this means that the (E)PDCCH bundle in which the uplink (downlink) grant is transmitted may not be transmitted before the transmission of the (E)PDCCH (bundle) in which the downlink (uplink) grant is transmitted ends. Hereinafter, examples will be described with reference to drawings.

Figure 22A:
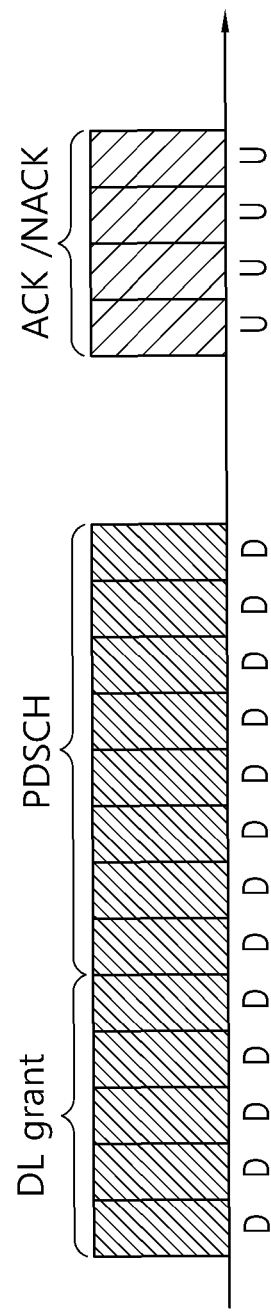

FIGS. 22a and 22b are Exemplary Diagrams Illustrating One Example of the HD-FDD Operation for the MTC Device of which the Coverage Expansion is not Required.

As described above, when the downlink grant and the uplink grant are simultaneously transmitted to the MTC device, there is a problem in that the MTC device needs to simultaneously perform the reception of the PDSCH and the transmission of the PUSCH in the same subframe region. Accordingly, in order to prevent the problem, it is proposed that the downlink grant and the uplink grant are not simultaneously transmitted as illustrated in FIGS. 22A and 22B.

Figure 23A:
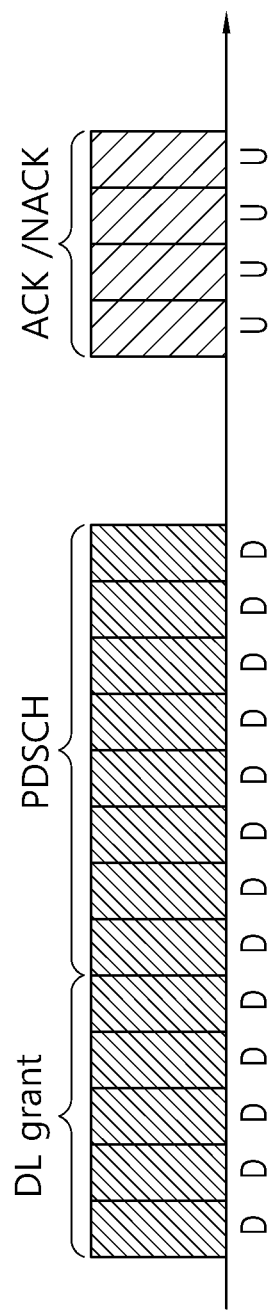
FIGS. 23a and 23b are exemplary diagrams illustrating another example of the HD-FDD operation for the MTC device of which the coverage expansion is not required.
Figure 23B:
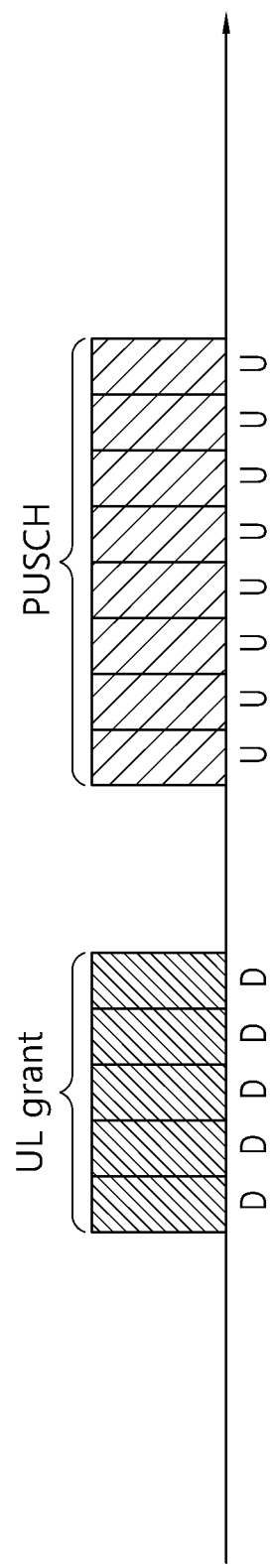

FIGS. 23a and 23b are Exemplary Diagrams Illustrating Another Example of the HD-FDD Operation for the MTC Device of which the Coverage Expansion is not Required.

When the subframe in which the transmission of the PDSCH bundle ends is called subframe n, it is proposed that the transmission of the uplink grant before subframe n−3 is not completed (does not end). That is, when the (E)PDCCH bundle in which the uplink grant is transmitted during the transmission of the PDSCH bundle is simultaneously transmitted, the transmission of the (E)PDCCH bundle in which the corresponding uplink grant is transmitted needs to end after the subframe n−2. As illustrated in FIGS. 23A and 23B, the reason is that when the transmission of the uplink grant ends after two subframes of the subframe in which the transmission of the PDSCH bundle ends, after the MTC device completes both the uplink grant and the reception of the PDSCH, the switching from the downlink to the uplink is performed, and thereafter, the transmission of the PUSCH may be stably performed. In order to simplify the complexity, before the subframe in which the transmission of the PDSCH bundle ends, the transmission of the uplink grant may not be completed.

Meanwhile, it is proposed that while the PDSCH bundle is transmitted, the downlink grant is not transmitted. For example, when the transmission of the PDSCH bundle is completed in the subframe n, the MTC device needs to transmit the ACK/NACK from subframe n+4 to the serving cell by switching a status from the uplink and the downlink. In this case, when the downlink grant is transmitted together while the PUSCH bundle is transmitted, the MTC device may receive the PUSCH bundle for a new downlink grant at the timing when the ACK/NACK for the PDSCH needs to be transmitted. The MTC device operating in the HD-FDD environment may not perform such an operation. Accordingly, while the PDSCH bundle is transmitted, a downlink grant for transmitting another PDSCH through the (E)PDCCH may not be transmitted.

Further, it is proposed that while the PHICH bundle is transmitted, the downlink grant is not transmitted. For example, when the transmission of the PHICH bundle is completed in the subframe n and the NACK is transmitted through the corresponding PHICH, the MTC device needs to retransmit the PUSCH from subframe n+4 to the serving cell by switching a status from the downlink and the uplink. In this case, when the downlink grant is transmitted together while the PHICH bundle is transmitted, the MTC device needs to receive the PDSCH bundle for a new downlink grant at the timing when the PUSCH retransmission needs to be performed. The MTC device operating in the HD-FDD environment may not perform such an operation. Accordingly, while the PHICH bundle is transmitted, the downlink grant may not be transmitted through the (E)PDCCH.

Figure 24:
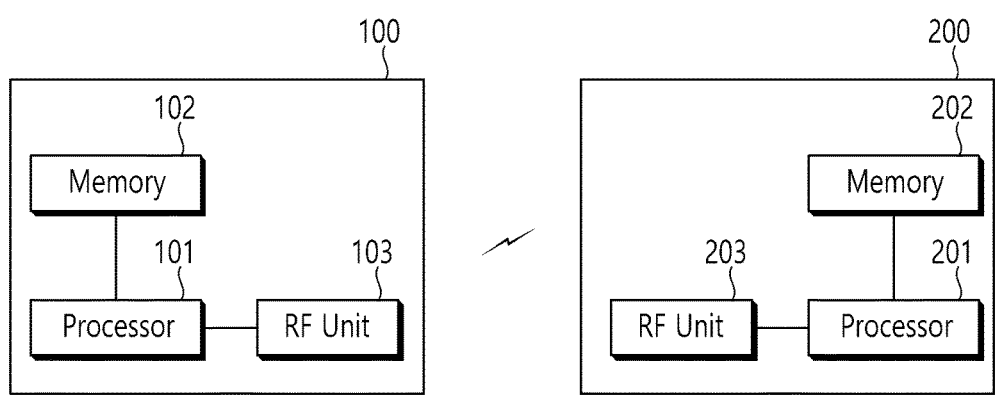
FIG. 24 is a block diagram illustrating a wireless communication system in which an embodiment of the present description is implemented.

The aforementioned embodiments of the present invention can be implemented through various means. For example, the embodiments of the present invention can be implemented in hardware, firmware, software, combination of them, etc. Details thereof will be described with reference to the drawing FIG. 24 is a block diagram of a wireless communication system according to an embodiment of the present description.

A BS 200 includes a processor 201, a memory 202, and a radio frequency (RF) unit 203. The memory 202 is coupled to the processor 201, and stores a variety of information for driving the processor 201. The RF unit 203 is coupled to the processor 201, and transmits and/or receives a radio signal. The processor 201 implements the proposed functions, procedures, and/or methods. In the aforementioned embodiment, an operation of the BS may be implemented by the processor 201.

An MTC device 100 includes a processor 101, a memory 102, and an RF unit 103. The memory 102 is coupled to the processor 101, and stores a variety of information for driving the processor 101. The RF unit 103 is coupled to the processor 101, and transmits and/or receives a radio signal. The processor 101 implements the proposed functions, procedures, and/or methods.

The processor may include Application-specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for monitoring a Physical Downlink Control Channel (PDCCH) signal, the method comprising:
determining, by a terminal, whether to monitor the PDCCH signal when a discontinuous reception (DRX) is configured,
wherein during an active time, the PDCCH signal is monitored on a downlink subframe, when the downlink subframe is not required for uplink transmission for a half-duplex operation in a frequency division duplex (FDD), when the downlink subframe is not a part of a configured measurement gap, and when the downlink subframe does not immediately precede an uplink subframe;
if the terminal is configured with a coverage enhancement (CE) for the half-duplex operation in the FDD, receiving, by the terminal, a physical downlink shared channel (PDSCH) signal which is repeated; and
transmitting, by the terminal, a physical uplink shared channel (PUSCH) signal which is repeated on a plurality of uplink subframes except for one or more uplink subframes that overlap with one or more downlink subframes where the PDSCH signal is repeated.

2. The method of claim 1, wherein when the downlink subframe immediately precedes the uplink subframe, a guard period is generated in the downlink subframe by not receiving a part or the entirety of the downlink subframe.

3. The method of claim 2, wherein when the guard period is generated in the downlink subframe, the PDCCH signal is not monitored in the downlink subframe.

4. The method of claim 1, wherein when the downlink subframe immediately precedes the uplink subframe, the PDCCH signal is not monitored on the downlink subframe during the active time.

5. The method of claim 4, wherein when the downlink subframe immediately precedes the uplink subframe, a guard period is generated in the downlink subframe by not receiving a part or the entirety of the downlink subframe.

6. The method of claim 5, wherein when the guard period is generated in the downlink subframe, the PDCCH signal is not monitored on the downlink subframe.

7. The method of claim 1, wherein as the half-duplex operation in the FDD is performed, a reception on the downlink subframe and a transmission on the uplink subframe are not simultaneously performed.

8. A terminal for monitoring a physical downlink control channel (PDCCH) signal, the terminal comprising:
a radio frequency (RF) unit; and
a processor configured to control the RF unit and determine whether to monitor the PDCCH signal when discontinuous reception (DRX) is configured,
wherein during an active time, the PDCCH signal is monitored on a downlink subframe, when the downlink subframe is not required for uplink transmission for a half-duplex operation in a frequency division duplex (FDD), when the downlink subframe is not a part of a configured measurement gap, and when the downlink subframe does not immediately precede an uplink subframe,
wherein if the terminal is configured with a coverage enhancement (CE) for the half-duplex operation in the FDD, the processor is further configured to receive a physical downlink shared channel (PDSCH) signal which is repeated, and
wherein the processor is further configured to transmit a physical uplink shared channel (PUSCH) signal which is repeated on a plurality of uplink subframes except for one or more uplink subframes that overlap with one or more downlink subframes where the PDSCH signal is repeated.

9. The terminal of claim 8, wherein when the downlink subframe immediately precedes the uplink subframe, a guard period is generated in the downlink subframe by not receiving a part or the entirety of the downlink subframe.

10. The terminal of claim 9, wherein when the guard period is generated in the downlink subframe, the PDCCH signal is not monitored in the downlink subframe.

11. The terminal of claim 8, wherein when the downlink subframe immediately precedes the uplink subframe, the PDCCH signal is not monitored on the downlink subframe during the active time.

12. The terminal of claim 11, wherein when the downlink subframe immediately precedes the uplink subframe, a guard period is generated in the downlink subframe by not receiving a part or the entirety of the downlink subframe.

13. The terminal of claim 12, when the guard period is generated in the downlink subframe, the PDCCH signal is not monitored on the downlink subframe.

14. The method of claim 1, wherein the downlink subframe is located in a downlink carrier and the uplink subframe is located in an uplink carrier.

15. The method of claim 1, further comprising:
if the downlink subframe immediately precedes the uplink subframe, determining that the downlink subframe immediately preceding the uplink subframe is not a valid subframe for measuring channel state information (CSI).

16. The terminal of claim 8, wherein if the downlink subframe immediately precedes the uplink subframe, the processor is further configured to determine that the downlink subframe immediately preceding the uplink subframe is not a valid subframe for measuring channel state information (CSI).

17. The method of claim 1, further comprising:
transmitting, by the terminal, uplink control information over time through different subcarriers in order to obtain frequency diversity gain.

18. The terminal of claim 8, wherein the processor controls the RF unit to transmit uplink control information over time through different subcarriers in order to obtain frequency diversity gain.

* * * * *